US012642167B2

(12) United States Patent
Docken et al.

(10) Patent No.: US 12,642,167 B2
(45) Date of Patent: Jun. 2, 2026

(54) AUTONOMOUS MOWER

(71) Applicant: THE TORO COMPANY,
Bloomington, MN (US)

(72) Inventors: Kevin Dale Docken, Victoria, MN
(US); Aaron Yarrow Curtis, Eagan,
MN (US)

(73) Assignee: THE TORO COMPANY,
Bloomington, MN (US)

( * ) Notice: Subject to any disclaimer, the term of this
patent is extended or adjusted under 35
U.S.C. 154(b) by 998 days.

(21) Appl. No.: 17/771,674

(22) PCT Filed: Nov. 4, 2020

(86) PCT No.: PCT/US2020/058826
§ 371 (c)(1),
(2) Date: Apr. 25, 2022

(87) PCT Pub. No.: WO2021/091972
PCT Pub. Date: May 14, 2021

(65) Prior Publication Data
US 2022/0369546 A1      Nov. 24, 2022

Related U.S. Application Data

(60) Provisional application No. 63/019,061, filed on May
1, 2020, provisional application No. 62/930,083, filed
on Nov. 4, 2019.

(51) Int. Cl.
*A01D 34/00*          (2006.01)
*A01D 34/74*          (2006.01)
*A01D 101/00*       (2006.01)

(52) U.S. Cl.
CPC ........... *A01D 34/008* (2013.01); *A01D 34/74*
(2013.01); *A01D 2101/00* (2013.01)

(58) Field of Classification Search
CPC .............................. A01D 34/008; A01D 34/74
(Continued)

(56) References Cited

U.S. PATENT DOCUMENTS

| 3,114,229 A | 12/1963 | Wilson |
| 4,479,346 A | 10/1984 | Chandler |

(Continued)

FOREIGN PATENT DOCUMENTS

| CN | 101982037 A | 3/2011 |
| CN | 201797741 U | 4/2011 |

(Continued)

OTHER PUBLICATIONS

Wiper Seals, Mar. 12, 2022, GallagherSeals https://www.gallagherseals.com/blog/gfs-wiper-seals-what-are-they-and-how-can-they-help-you (Year: 2022).*

(Continued)

*Primary Examiner* — Joseph M Rocca
*Assistant Examiner* — Sunny D Webb
(74) *Attorney, Agent, or Firm* — Mueting Raasch Group

(57)          ABSTRACT

An autonomous ground working vehicle has a motor housing defining a motor cavity extending in an axial direction and a first inner housing portion having a first helical thread about the motor cavity and a second inner housing portion having a second helical thread about the motor cavity that engages the first helical thread. The first inner housing portion is axially translatable and rotatably fixed relative to a chassis. The second inner housing portion is rotatable relative to the chassis and axially fixed relative to the chassis. The first inner housing portion has (1) an inner body extending from a motor mounting surface into the second inner housing portion and defines the first helical thread and (2) an outer body extending axially from the motor mounting surface. The outer body and the inner body define an (Continued)

annular gap that receives a portion of the second inner housing portion.

18 Claims, 13 Drawing Sheets

(58) Field of Classification Search
USPC .............. 56/17.1, 11.8, 15.8, 295, 17.5, 255, 56/320.1; 241/194; D15/14
See application file for complete search history.

(56) References Cited

U.S. PATENT DOCUMENTS

| | | | | |
|---|---|---|---|---|
| 5,203,151 | A | | 4/1993 | Mills |
| 7,707,812 | B2 * | 5/2010 | Cheung .................. | A01D 34/78 56/15.8 |
| 8,234,848 | B2 * | 8/2012 | Messina ............... | A01D 34/008 56/17.1 |
| 8,336,282 | B2 * | 12/2012 | Messina ............... | B60L 3/0061 56/320.1 |
| 9,357,699 | B2 | 6/2016 | Elonsson | |
| 10,555,457 | B2 * | 2/2020 | Song .................... | A01D 34/828 |
| 10,716,254 | B2 | 7/2020 | Song et al. | |
| 11,129,330 | B2 * | 9/2021 | Hong ..................... | A01D 34/74 |
| 11,812,691 | B2 * | 11/2023 | Roberts .................. | A01D 34/64 |
| 2006/0213170 | A1 * | 9/2006 | Barnett ............... | A01D 34/664 56/295 |
| 2007/0234698 | A1 | 10/2007 | Silbernagel et al. | |
| 2012/0023880 | A1 | 2/2012 | Messina et al. | |
| 2017/0181375 | A1 | 6/2017 | Hashimoto et al. | |
| 2018/0206402 | A1 | 7/2018 | Ran et al. | |
| 2019/0307060 | A1 | 10/2019 | Hong et al. | |
| 2020/0170186 | A1 * | 6/2020 | Curtis .................... | F16H 25/20 |

FOREIGN PATENT DOCUMENTS

| | | | | | |
|---|---|---|---|---|---|
| CN | 201830660 | U | * | 5/2011 | |
| CN | 206274765 | U | * | 6/2017 | |
| DE | 202010008414 | U1 | * | 1/2012 | .......... A01D 34/008 |
| DE | 202013006712 | U1 | | 8/2013 | |
| DE | 212014000186 | U1 | | 4/2016 | |
| EP | 0634091 | A1 | | 1/1995 | |
| EP | 1495661 | A1 | | 1/2005 | |
| EP | 2422602 | A1 | * | 2/2012 | .......... A01D 34/008 |
| EP | 2425701 | A2 | | 3/2012 | |
| EP | 2783563 | A1 | | 10/2014 | |
| EP | 3295781 | A1 | | 3/2018 | |
| EP | 3342268 | A1 | | 7/2018 | |
| EP | 3549427 | A1 | | 10/2019 | |
| GB | 2481108 | A | | 12/2011 | |
| JP | 2018074919 | A | * | 5/2018 | |
| WO | WO 2013/025135 | A1 | | 2/2013 | |
| WO | WO 2015/040987 | A1 | | 3/2015 | |
| WO | WO 2015/130201 | A1 | | 9/2015 | |
| WO | WO 2016/150503 | A1 | | 9/2016 | |

OTHER PUBLICATIONS

PCT Patent Application No. PCT/US2020/058826, filed Nov. 4, 2020; International Preliminary Report on Patentability dated May 10, 2022; 11 pages.
PCT Patent Application No. PCT/US2020/058826, filed Nov. 4, 2020; International Search Report and Written Opinion dated Mar. 30, 2021; 16 pages.

* cited by examiner

AUTONOMOUS MOWER

This application is a 35 U.S.C. § 371 U.S. National Stage of International Application No. PCT/US2020/058826, filed Nov. 4, 2020, which claims the benefit of U.S. Provisional Application No. 62/930,083, filed Nov. 4, 2019, and U.S. Provisional Application No. 63/019,061, filed May 1, 2020, which are hereby incorporated by reference in their entireties.

TECHNOLOGICAL FIELD

Embodiments of the present disclosure relates to autonomous ground working vehicles and, more particularly, to an autonomous mower.

BACKGROUND

Lawn and garden machines are known for performing a variety of tasks. For instance, powered lawn mowers are used by both homeowners and professionals alike to maintain turf areas within a property or yard.

Mowers that autonomously perform a grass cutting function are also known. Autonomous mowers typically have a deck or housing supporting one or more cutting blades. Battery-powered electric motors can power both the cutting blade(s) and a propulsion system.

As with conventional mowers, it can be beneficial to adjust the height of cut provided by the mower. For example, lawn conditions and/or homeowner preferences can benefit from cutting the grass at one of several different heights.

SUMMARY

Some embodiments of the technology disclosed herein relate to an autonomous ground working vehicle. The vehicle has a chassis, wheels coupled to the chassis, and a motor housing coupled to the chassis. The motor housing defines a motor cavity extending in an axial direction and has a first inner housing portion having a first helical thread about the motor cavity. The motor housing also has a second inner housing portion having a second helical thread about the motor cavity that engages the first helical thread. The first inner housing portion has a motor mounting surface and is axially translatable relative to the chassis and rotatably fixed relative to the chassis. The second inner housing portion is rotatable relative to the chassis and axially fixed relative to the chassis. A tool motor is fixed to the motor mounting surface, and the tool motor has an output shaft extending in a first direction. A tool is fixed to the output shaft.

In some such embodiments, the second inner housing portion has gear teeth about the motor cavity and the vehicle has a pinion gear engaging the gear teeth. Additionally or alternatively, the vehicle has a height adjustment motor operatively coupled to the pinion gear. Additionally or alternatively, the output shaft of the tool motor has a tool axis and the motor housing has a housing axis, and the tool axis is non-parallel to the housing axis. Additionally or alternatively, the motor mounting surface is orthogonal to the tool axis. Additionally or alternatively, the motor housing has a casing fixed to the chassis, where the casing surrounds the first inner housing portion.

Additionally or alternatively, the chassis defines a cutting assembly opening that receives the first inner housing portion, and the vehicle has a wiper seal disposed between the first inner housing portion and the chassis about the cutting assembly opening, where the wiper seal contacts the first inner housing portion and the chassis. Additionally or alternatively, the first inner housing portion has an inner body and an outer body. The inner body extends from the motor mounting surface towards the second inner housing portion and defines the first helical thread and the outer body extends axially from the motor mounting surface towards the second inner housing portion, where the outer body and the inner body define an annular gap that receives a portion of the second inner housing portion. Additionally or alternatively, the vehicle has a manually rotatable handle configured to selectively rotate the second inner housing portion.

Additionally or alternatively, the tool has a cutting disk coupled to the output shaft and a plurality of cutting blades coupled to the cutting disk. Each cutting blade extends outward from the cutting disk and defines a first straight cutting edge, a proximal end, and a distal end, where the first straight cutting edge intersects the distal end and forms an acute angle with the distal end. Additionally or alternatively, each cutting blade defines a second straight cutting edge that intersects the distal end, where the first cutting edge and the second cutting edge diverge from each other as they approach the distal end.

Some embodiments of the current technology relate to a cutting assembly of an autonomous lawn mower. A blade body has a proximal end, a distal end having a length, a first face, and a second face. The blade body defines a fastener opening towards the proximal end and a first cutting edge defined by the first face. The first cutting edge extends along a straight line from the distal end towards the proximal end and forms an acute angle with the distal end.

In some such embodiments, the blade body further defines a second cutting edge defined by the second face, where the second cutting edge extends along a straight line from the distal end towards the proximal end and forms an acute angle with the distal end. Additionally or alternatively, the distal end of the blade body defines the widest portion of the blade body. Additionally or alternatively, the length of the distal end is greater than 1 cm. Additionally or alternatively, the blade body has a width that tapers from the distal end towards the proximal end. Additionally or alternatively, the cutting assembly has a rotatable cutting disk, where the blade body is coupled to the rotatable cutting disk via the fastener opening and the blade body extends outward from the cutting disk.

Additionally or alternatively, the cutting assembly has a tool motor and a motor housing. The tool motor has an output shaft fixed to the rotatable cutting disk and the motor housing defines a motor cavity extending in an axial direction. The motor housing has a first inner housing portion having a first helical thread about the motor cavity and a second inner housing portion having a second helical thread about the motor cavity that engages the first helical thread. The first inner housing portion has a motor mounting surface that is fixed to the tool motor and the first inner housing portion is axially translatable along the second inner housing portion and rotatably fixed relative to the second inner housing portion. The second inner housing portion is rotatable relative to the first inner housing portion and axially fixed relative to the first inner housing portion. Additionally or alternatively, the first inner housing portion is disposed within the second inner housing portion. Additionally or alternatively, the second inner housing portion has gear teeth about the motor cavity and a pinion gear engaging the gear teeth. Additionally or alternatively, the cutting assembly has a height adjustment motor operatively coupled to the pinion gear.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
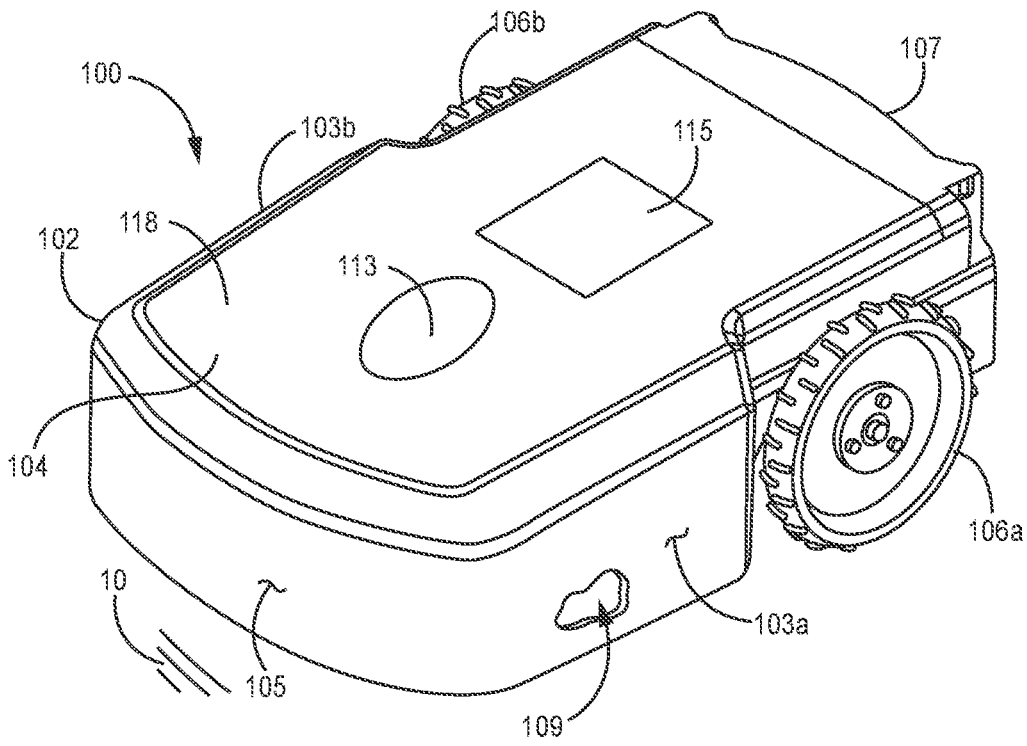
FIG. 1 is a front perspective view of an example autonomous ground working vehicle (e.g., lawn mower) in accordance with various embodiments.

The figures are rendered primarily for clarity and, as a result, are not necessarily drawn to scale. Moreover, various structure/components, including but not limited to fasteners, electrical components (wiring, cables, etc.), and the like, can be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which cannot be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." Further, the term "and/or" (if used) means one or all of the listed elements or a combination of any two or more of the listed elements. Still further, "i.e." can be used herein as an abbreviation for the Latin phrase id est, and means "that is," while "e.g.," can be used as an abbreviation for the Latin phrase exempli gratia and means "for example."

Embodiments of the present disclosure are directed to autonomous ground working machines or vehicles and to methods of operating the same within a predefined work region (e.g., a turf area of a residential or commercial property). Such vehicles can have a tool and can operate the tool autonomously within the work region. For example, the vehicle can be configured as an autonomous lawn mower adapted to cut grass as the mower travels over the work region. Vehicles in accordance with embodiments of the present disclosure can thus have a tool (e.g., cutting blade) control system formed by a tool (e.g., blade) drive system and a tool (e.g., blade) height adjustment (e.g., height-of-cut (HOC)) control system. The HOC control system can allow the mower to automatically change the height of cut grass, and/or can permit the operator to adjust the height of cut via commands issued from a remote computer (e.g., desktop computer, tablet, smart phone) or dedicated local (attached to the mower) interface. Moreover, HOC control systems in accordance with embodiments of the present disclosure can be manufactured in a cost-effective manner while still providing consistent transition between different heights-of-cut (i.e., height-of-cut changes can occur with little or minimal binding or chatter).

While the "tool" is described herein as cutting blade for a lawn mower, such a configuration is exemplary only as systems and methods described herein can also find application to other autonomously operated vehicles incorporating other tools including, for example, commercial turf products, other ground working vehicles (e.g., debris blowers/vacuums, aerators, material spreaders, snow throwers), as well as indoor working vehicles such as vacuums and floor scrubbers/cleaners.

It is noted that the term "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like can be used herein and, if so, are from the perspective shown in the particular figure, or while the vehicle (e.g., mower 100) is operating upon a ground surface 10 as shown in FIG. 1. These terms are used only to simplify the description, however, and not to limit the interpretation of any embodiment described.

Still further, the suffixes "a" and "b" can be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix can apply, unless noted otherwise, to both the corresponding left and right part/feature.

Figure 2:
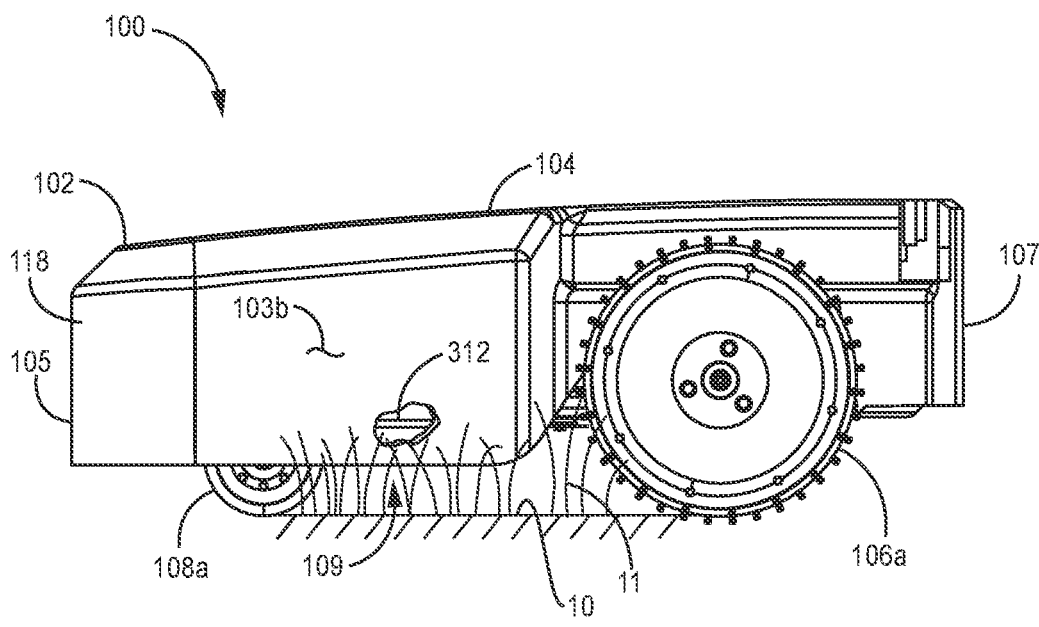
FIG. 2 is a side elevation view of the mower of FIG. 1.

FIGS. 1 and 2 illustrate a perspective view and side elevation view, respectively, of an exemplary working vehicle, e.g., autonomous lawn mower 100, in accordance with embodiments of the present disclosure. The mower 100 can have a mower housing or deck 102 (including a chassis 110; see FIG. 3) supported in rolling engagement upon a ground surface 10 by two or more ground-engaging wheels. For example, rear wheels 106 (e.g., rear wheels 106a, 106b) and front wheels 108 (e.g., front wheels 108a, 108b; see FIG. 3) can be attached, respectively, at or near the rear and front sides of the deck 102 as shown. The wheels can rotate, relative to the deck 102, as the deck translates over the ground surface 10. Some of the wheels can be powered to propel the mower during operation. For example, the rear wheels 106 can be independently driven in forward and reverse directions, while the front wheels can passively caster. As a result, differential rotation of the rear wheels 106 can affect both forward and reverse propulsion as well as steering of the mower 100.

Figure 3:
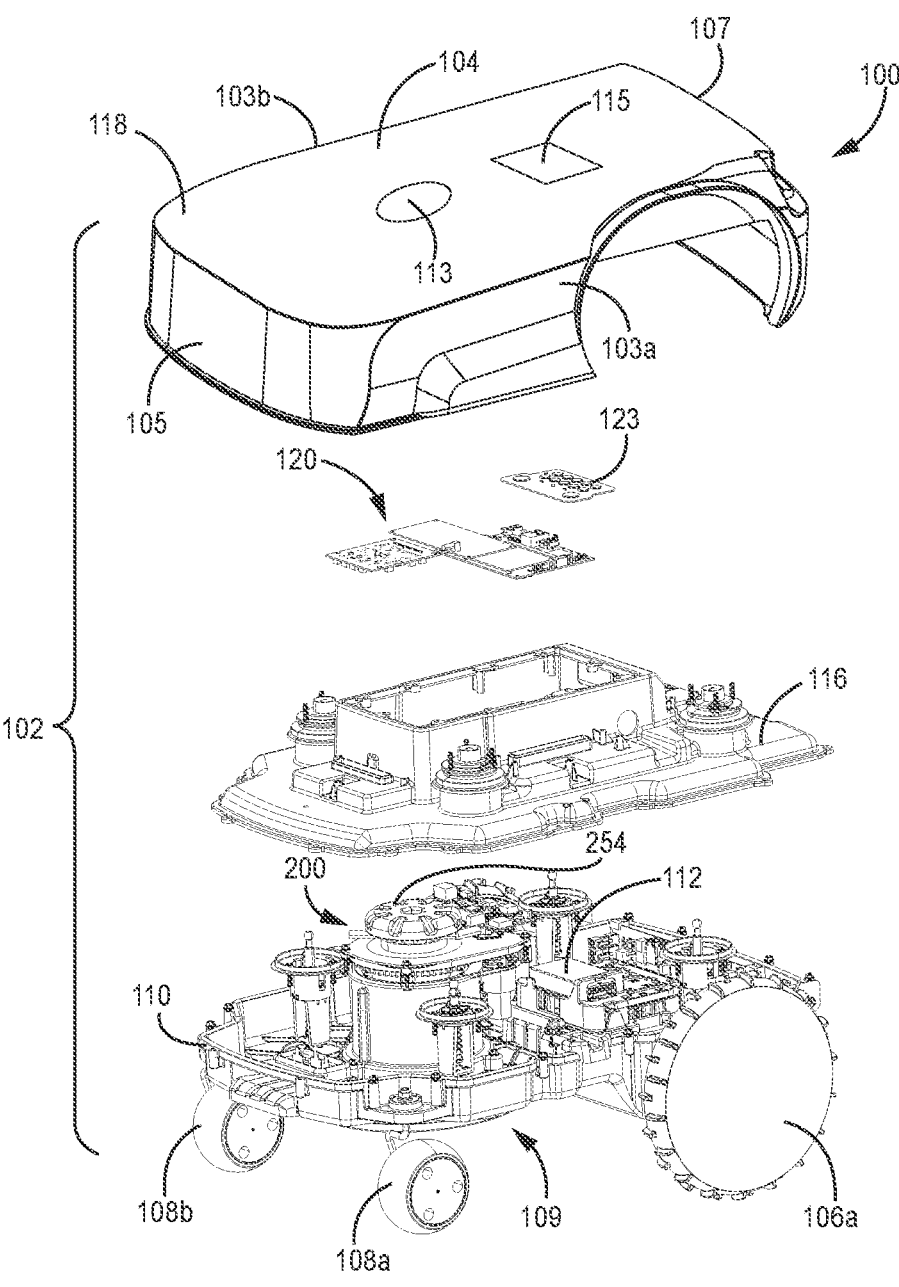
FIG. 3 is an exploded perspective view of an example autonomous ground working vehicle in accordance with various embodiments.
Figure 4:
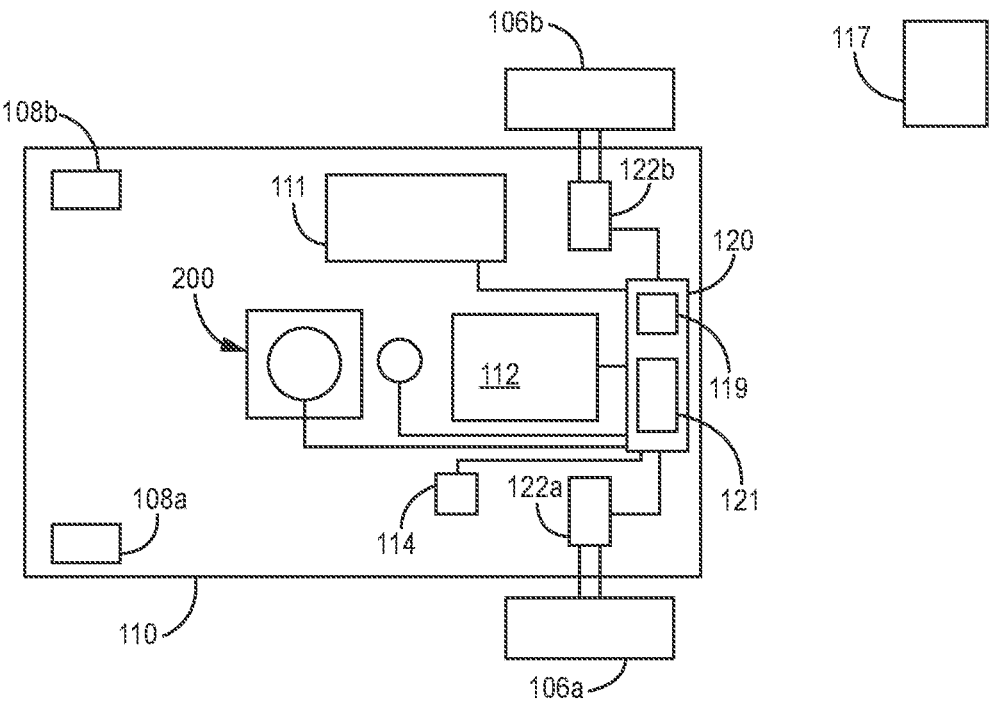
FIG. 4 is a schematic view illustrating different components of various autonomous lawn mowers consistent various embodiments.

As shown in FIGS. 3 and 4, the deck 102 can have a chassis 110 adapted to support various components of the mower. For example, the chassis 110 can be coupled to the wheels 106, 108 and corresponding drive wheel motors 122, radio 111, a battery(s) 112, a cutting assembly 200, and a controller 120 among other components. The deck 102 can have a chassis cover 116 adapted to at least partially seal or otherwise protect various components of the mower 100 and chassis 110. The deck 102 can have a bump shroud 118 that forms an outer body of the mower 100.

The bump shroud 118 can form a plurality of sidewalls (e.g., left and right sidewalls 103 (e.g., left sidewall 103b, right sidewall 103a), front sidewall 105, and rear sidewall 107) that partially enclose the chassis 110. In particular, the bump shroud at least partially encloses an upper portion of the chassis 110 and the chassis cover 116. A cutting chamber 109 is defined under the chassis 110. In some embodiments the bump shroud surrounds a portion of the cutting chamber 109. In some embodiments, the sidewalls can be configured to detect contact of the moving mower 100 with obstacles. Moreover, the left and right sidewalls 103 can extend outwardly to or beyond the rear wheel track width to effectively form trim edges of the mower during operation. The bump shroud 118 can have a roof portion 104 that defines the top side of the mower 100, where the roof portion 104 is coupled to each of the plurality of sidewalls 103, 105, 107.

The roof portion 104 can have one or more access openings 113, 115 to provide user access to a control panel 123 (FIG. 3) and/or manually operable adjustment features (which will be described in more detail below). In some embodiments, an access opening 113, 115 can have a manually openable cover that selectively provides access to a control panel or other adjustment features. In some embodiments, a control panel can be disposed across an access opening 113, 115 and in other embodiments, an access opening 113, 115 can be omitted and a control panel can be disposed on the roof portion 104.

Figure 5:
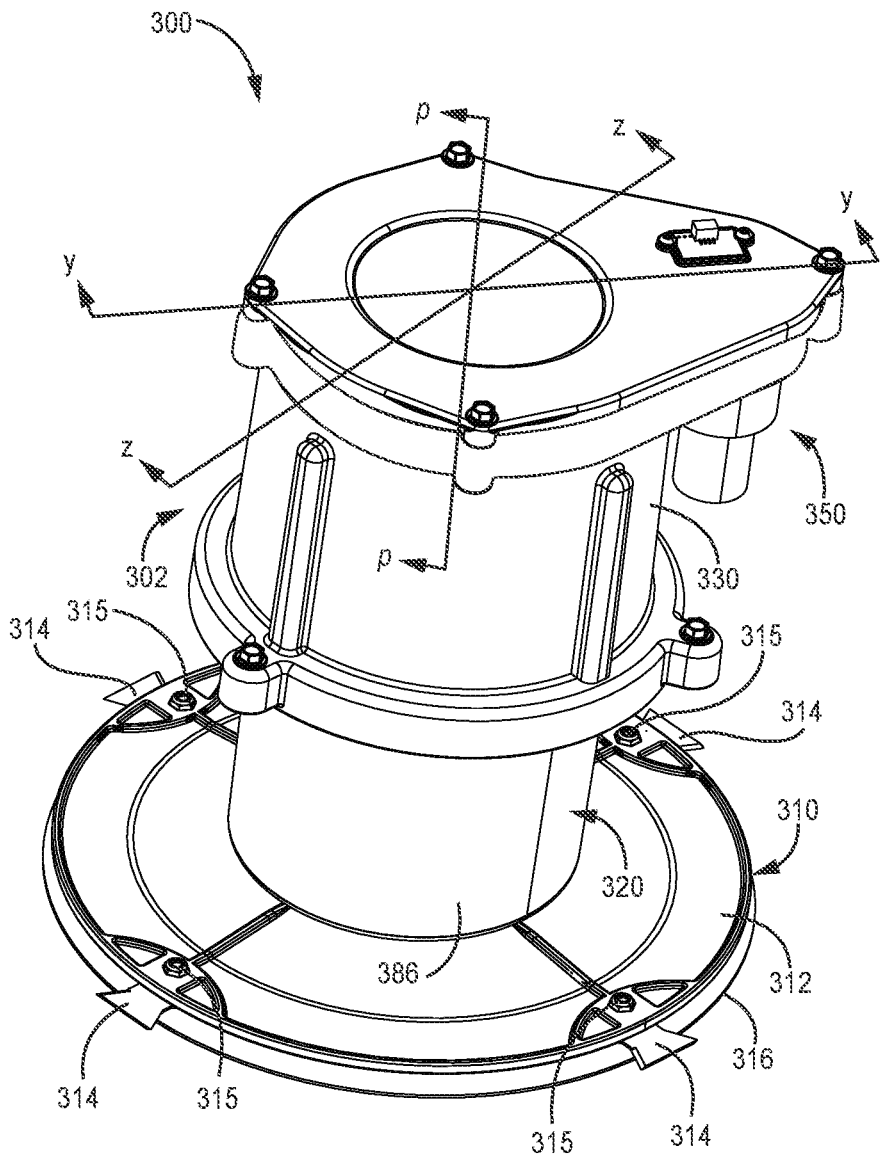
FIG. 5 is an isolated perspective view of an example cutting assembly consistent with various embodiments.
Figure 6:
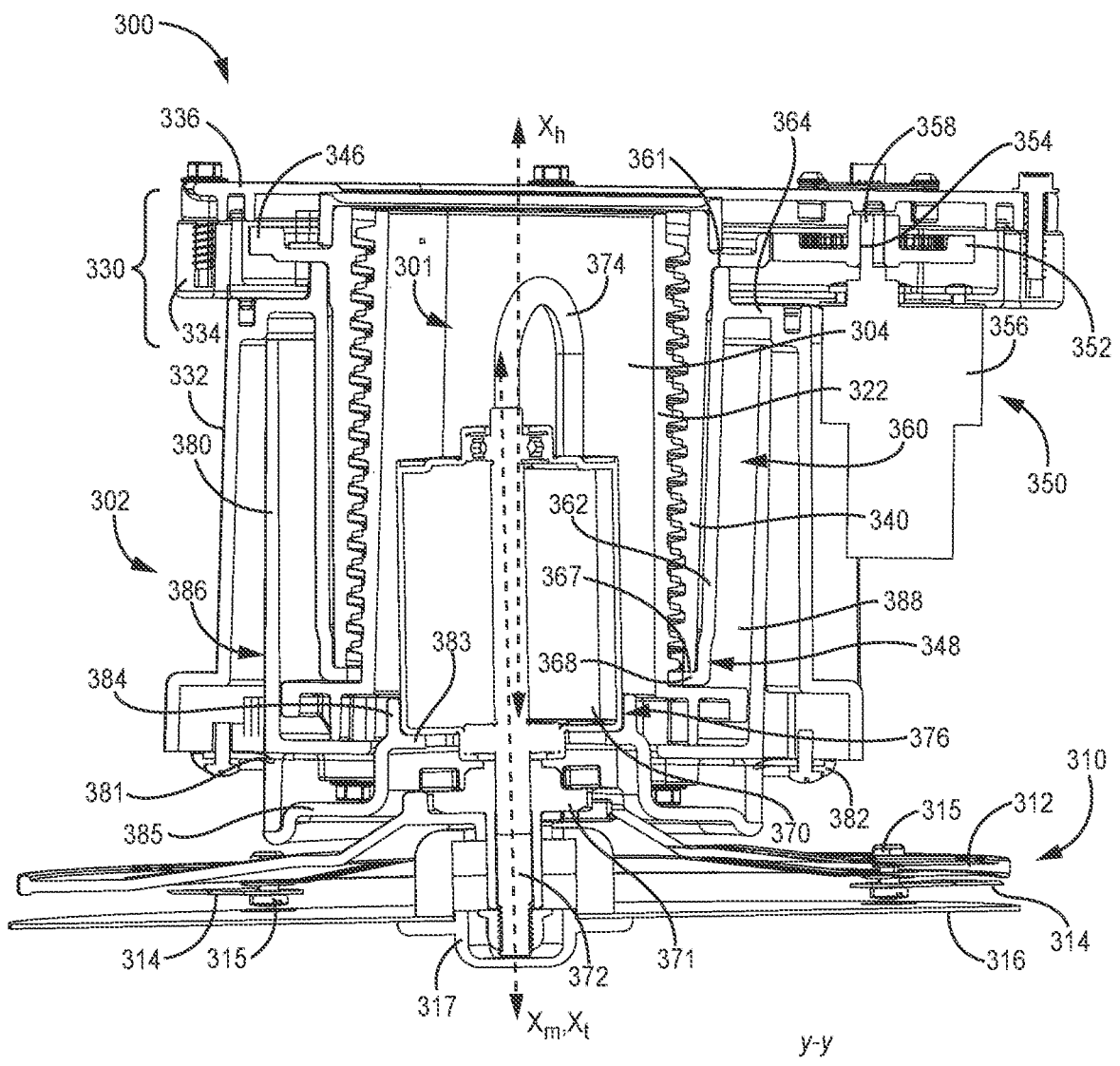
FIG. 6 is a cross-sectional view consistent with the example cutting assembly of FIG. 5.
Figure 7:
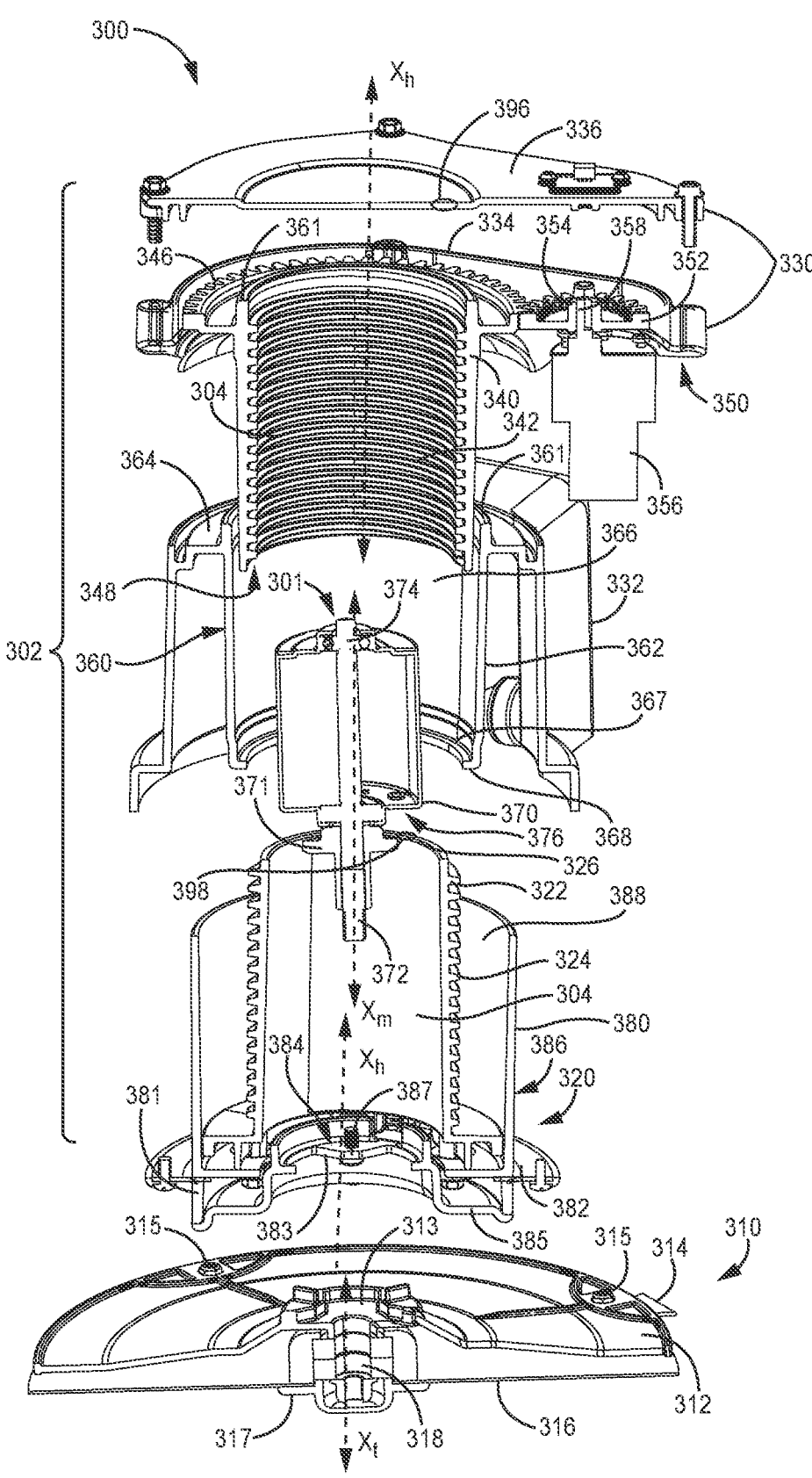
FIG. 7 is an exploded cross-sectional view consistent with the cutting assembly of FIG. 5.
Figure 8:
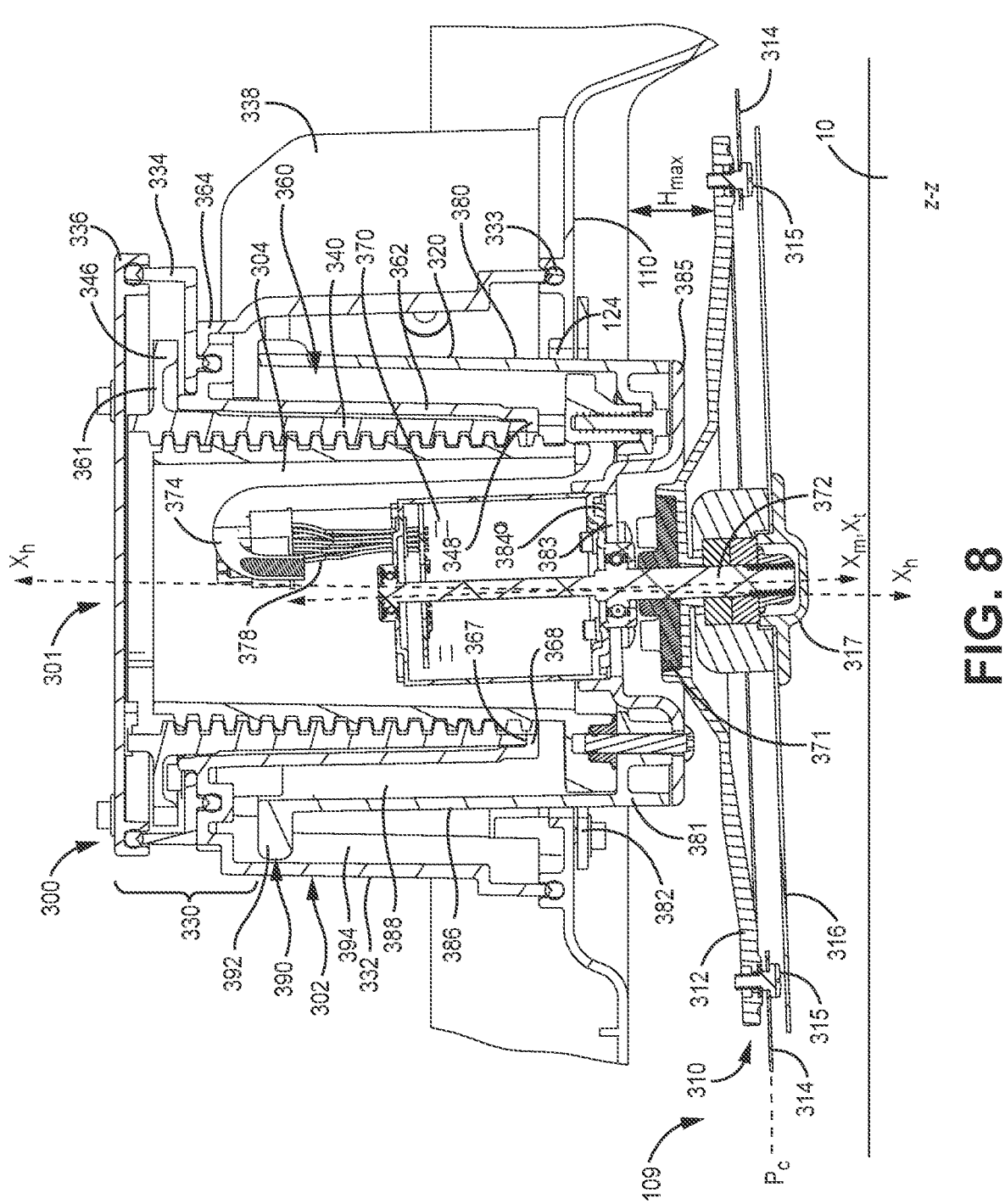
FIG. 8 is another cross-sectional view consistent with the cutting assembly of FIG. 5.

FIG. 5 depicts a perspective view of an example cutting assembly 300 consistent with various embodiments, FIG. 6 depicts a cross-sectional view y-y consistent with the example cutting assembly 300 of FIG. 5, FIG. 7 is an exploded cross-sectional view of FIG. 6, and FIG. 8 is another cross-sectional view z-z of FIG. 5 where the cutting assembly 300 is coupled to an example chassis 110. The example cutting assembly 300 can be incorporated in various mowers, such as the example mower 100 described above. The cutting assembly 300 is generally configured to cut grass. The cutting assembly 300 has a motor housing 302 defining a motor cavity 304, a tool motor 370 disposed in the motor cavity 304 and a tool 310 operatively coupled to the tool motor 370. In various embodiments the tool 310 is a cutting blade assembly 310.

The tool motor 370 is adapted to power at least one ground working tool as further described herein. While illustrated herein as an electric tool motor 370, alternative prime movers, such as internal combustion engines, are also contemplated. The tool motor 370 has an output shaft 372 defining a motor axis $x_m$ that extends in a first direction through the motor cavity 304. In various embodiments, the tool motor 370 is configured to rotate the output shaft 372 clockwise and counterclockwise relative to the motor axis $x_m$.

A ground working tool (e.g., rotatable cutting blade assembly 310) can be coupled to the output shaft 372. The cutting blade assembly 310 can have a plurality of (e.g., four) cutting blades 314 coupled to a cutting disk 312, where the cutting disk 312 is coupled to the output shaft 372. Each cutting blade 314 extends outward from the cutting disk 312 during operation. The cutting blade assembly 310 has a tool axis $x_t$ about which the cutting disk 312 is rotatable. In operation, the cutting blades 314 are configured to revolve about the tool axis $x_t$. In various embodiments, the cutting blades 314 are configured to revolve about the tool axis $x_t$ in each of a clockwise direction and a counterclockwise direction. In some embodiments, the tool axis $x_t$ can be collinear with the motor axis $x_m$. Each of the cutting blades 314 are coupled to the cutting disk 312 with a blade fastener 315 such as a bolt, screw, pin, or the like. In some embodiments, each of the cutting blades 314 can be pivotably coupled to the cutting disk 312 by the blade fastener 315.

In the current example, a protective plate 316 is coupled to the output shaft 372 that is configured to be positioned between a ground surface (such as ground surface 10 in FIG. 2) and the blade fastener 315, but in some embodiments the protective plate 316 can be omitted. The cutting disk 312 can be attached, directly or indirectly, to the output shaft 372 by a disk fastener 317. In particular, the various components of the cutting blade assembly 310 can define an output shaft opening 318 (FIG. 7) that is configured to receive the output shaft 372. The various components of the cutting blade assembly 310 can be fixed to the output shaft 372 by securing the disk fastener 317 to the output shaft 372 via, for example, mating threads mutually defined by the disk fastener 317 and the output shaft 372.

During operation, the output shaft 372 rotates the cutting blade assembly 310 at a speed sufficient to permit the cutting blades 314 to sever grass 11 (see FIG. 2) and other vegetation over which the deck 102 passes. By pivotally coupling each cutting blade 314 to the rotatable cutting disk 312, the cutting blades are capable of incurring blade strikes against various objects (e.g., rocks, tree roots, etc.) without causing excessive damage to the cutting blades 314, cutting blade assembly 310, output shaft 372, tool motor 370, and/or other portions of the mower 100. While described herein in the context of one or more cutting "blades," other cutting elements including, for example, conventional mower blades, flexible string or line elements, etc., are certainly possible without departing from the scope of this disclosure.

As stated above, the wheels 106 can be powered (e.g., by separate drive wheel motors 122; see FIG. 4) so that the mower 100 is self-propelled. While shown having four wheels, other embodiments can utilize any number of wheels (e.g., two or more). Still further, as used herein, "wheels" can refer to other ground-engaging members such as tracks, rollers, or skids.

Referring back generally to FIGS. 1-4, the mower 100 can have one or more sensors 114 (FIG. 4) to assist with localization. For instance, some embodiments can have a global positioning system (GPS) receiver adapted to estimate a position of the mower 100 within the work region and provide such information to the controller 120 (see FIG. 4). In other embodiments, one or more of the wheels 106, 108 can have encoders (not shown) that provide wheel rotation/ speed information that can be used to estimate mower position (e.g., based upon an initial start position) within a given work region. Other sensors (e.g., inertial measurement unit, vision (camera) sensor, infrared sensor, radio detection and ranging (radar) sensor, light detection and ranging (lidar) sensor, etc.) now known or later developed can also be incorporated into the mower 100. The mower 100 can further have sensors adapted to detect a boundary wire when the latter is used to define a boundary of the work region.

Referring specifically to FIGS. 3 and 4, the controller 120 can be adapted to electronically monitor and control various mower functions. An exemplary controller can have a processor 119 (FIG. 4) that receives various inputs and executes one or more computer programs or applications stored in memory 121. The memory 121 can have computer-readable instructions or applications that, when executed, e.g., by the processor 119, cause the controller 120 to perform various calculations and/or issue commands. That is to say, the processor 119 and memory 121 can together define a computing apparatus operable to process input data and generate the desired output to one or more components/devices. For example, the processor 119 can receive various input data including positional data from the GPS receiver and/or wheel encoders and generate speed and steering angle commands to drive wheel motors 122 and cause the rear wheels 106 to rotate (at the same or different speeds and in the same or different directions). The controller 120 can further control the cutting assembly 200 (e.g., both the tool motor 370 described above and an HOC control system, which will be described below). In other words, the controller 120 can control the steering angle and speed of the mower 100, as well as the operation and height of the cutting blade assembly 310.

In view of the above, it will be readily apparent that the functionality of the controller 120 can be implemented in any manner known to one skilled in the art. For instance, the memory 121 can have any volatile, non-volatile, magnetic, optical, and/or electrical media, such as a random-access memory (RAM), read-only memory (ROM), non-volatile RAM (NVRAM), electrically-erasable programmable ROM (EEPROM), flash memory, and/or any other digital media. While shown as both being incorporated into the controller 120, the memory 121 and the processor 119 could be contained in separate modules.

The processor 119 can have any one or more of a microprocessor, a controller, a digital signal processor (DSP), an application specific integrated circuit (ASIC), a field-programmable gate array (FPGA), and/or equivalent discrete or integrated logic circuitry. In some embodiments, the processor 119 can have multiple components, such as any combination of one or more microprocessors, one or more controllers, one or more DSPs, one or more ASICs, and/or one or more FPGAs, as well as other discrete or integrated logic circuitry. The functions attributed to the controller/processor herein can be embodied as software, firmware, hardware, or any combination thereof. In at least one embodiment, various subsystems of the mower 100, as described above, could be connected in most any manner, e.g., directly to one another, wirelessly, via a bus architecture (e.g., controller area network (CAN) bus), or any other connection configuration that permits data and/or power to pass between the various components (e.g., controller, tool motor, HOC control system (e.g., height adjustment or height adjustment motor as further described below), drive wheel motors 122, GPS, wheel encoders, bump sensors, etc.) of the mower.

With specific reference to FIGS. 6-8, an exemplary tool drive system 301 is now described. The tool drive system 301 in combination with a HOC control system can together define the cutting assembly 300. The tool drive system 301 can have a prime mover (e.g., electric tool motor 370) secured to and directly supported by a motor mounting surface 384 on a frame, e g., motor frame 385. The motor frame 385 is configured to be coupled to the chassis 110 of a mower and supports a tool (e.g., cutting blade assembly 310) relative to the chassis 110. As further described below, the motor frame 385 is axially translatable relative to the chassis 110 (e.g., along axis $x_m$) to allow adjustment of a height of the tool (e.g., cutting blade assembly 310) relative to the ground surface 10.

The tool motor 370 can be fixed to the motor frame 385 where it can rest upon a flange 383 defining at least a portion of the motor mounting surface 384. In particular, the tool motor 370 can have a mating surface 376 that is configured to be mounted to the motor mounting surface 384. The motor mounting surface 384 can define fastener openings 387 (one of which is visible in FIG. 7) that are configured to align with aligning fastener openings of the tool motor 370 (not currently visible) to mutually receive a fastener (not shown) to secure the tool motor 370 to the motor mounting surface 384. In some embodiments, the motor mounting surface 384 is orthogonal to the motor axis $x_m$. In some embodiments, the motor mounting surface 384 is orthogonal to the tool axis $x_t$.

The tool motor 370 can have a wiring harness 378 (visible in FIG. 8) to permit communication of the tool motor 370 with the controller 120 (see FIG. 4). A power cord 374 is coupled to the tool motor 370 that is configured to provide power to the tool motor 370 from the battery 112 (see FIG. 4) to selectively rotate the cutting blade assembly 310. In some embodiments, the motor housing 302 can be provided to cover portions of the tool drive system 301 and HOC control system located above the chassis 110.

A motor key 371 can be secured to the output shaft 372 of the tool motor 370 such that the motor key 371 rotates with the output shaft 372. The motor key 371 can be received within a keyway 313 (visible in FIG. 7) formed in the cutting disk 312 of the cutting blade assembly 310 to permit transmission of rotational force from the tool motor 370 to the cutting disk 312.

The motor cavity 304/motor housing 302 can have a central axis, which is referred to herein as the housing axis $x_h$, extending in the axial direction. In a variety of embodiments, the housing axis $x_h$ of the motor housing 302 is oblique to each of the motor mounting surface 384, the motor axis $x_m$ and the tool axis $x_t$. As such, the housing axis $x_h$ is nonparallel to the tool axis $x_t$ and the motor axis $x_m$. In such embodiments, the cutting blade assembly 310 can be configured to operate in a plane Pc that is oblique to a generally planar ground surface 10 (FIG. 8). The angle between the plane Pc defined by the cutting blade assembly 310 and a generally planar ground surface 10 can be referred to as the "rake angle" of the vehicle 100 (which is a mower 100 in the current example). The rake angle is generally measured from the front to the back of the vehicle 100. In some embodiments, however there can be an angle from the right side to the left side of the vehicle (or vice versa). The angle can range from 2° to 10°, 3° to 7° or 4° to 6°, in embodiments. In one particular example, the angle is 5°. The angle between the motor axis $x_m$ and/or tool axis $x_t$ and the housing axis $x_h$ can be equivalent to the angle, in various embodiments.

As stated above, the cutting assembly 200 can also have the HOC control system as shown in FIGS. 5-7. The HOC control system can be used to adjust the relative height of the cutting blades 314 (e.g., of the cutting disk 312) relative to the chassis 110 or the ground surface 10 (see FIG. 2) to allow corresponding variation in the height of cut grass 11. In various embodiments, the HOC control system does not modify the angle (such as the rake angle) of the cutting blade assembly 310.

With reference first to FIG. 7, the exemplary HOC control system is defined, in part, by components of the motor housing 302. The motor housing 302 is generally coupled to the chassis 110 and defines the motor cavity 304 extending in the axial direction. In particular, the motor housing 302 has a first inner housing portion 320 and a second inner housing portion 340. Each of the first inner housing portion 320 and the second inner housing portion 340 are translatable relative to the chassis and are operatively coupled to modify the height of the cutting blades 314. The first inner housing portion 320 has the motor frame 385, which defines the motor mounting surface 384.

The chassis 110 defines a cutting assembly opening 124 (see FIG. 8). The cutting assembly 300 extends from the upper portion of the chassis 110 to the cutting chamber 109 through the cutting assembly opening 124. In particular, the first inner housing portion 320 extends through the cutting assembly opening 124 such that the cutting blade assembly 310 is positioned between the chassis 110 and the ground surface 10. The cutting blade assembly 310 is generally positioned below the chassis. The tool motor 370 is generally housed above the chassis 110.

In the current example, the first inner housing portion 320 and the second inner housing portion 340 are in threaded engagement. The first inner housing portion 320 defines a first helical thread 324 about the motor cavity 304 and the second housing portion defines a second helical thread 342 about the motor cavity 304. The second helical thread 342 engages the first helical thread 324. The first inner housing portion 320 is axially translatable and generally rotatably fixed relative to the chassis, and the second inner housing portion 340 is axially fixed relative to the chassis and rotatable relative to the chassis. As such, when the second inner housing portion 340 rotates relative to the chassis (and the first inner housing portion 320), the interaction between the first helical thread 324 and the second helical thread 342 results in axial translation of the first inner housing portion 320 and, therefore, the motor mounting surface 384 and the cutting blade assembly 310, relative to the chassis (and the second inner housing portion 340) along axis $x_m$.

In the current example, the first inner housing portion 320 defines an external (i.e., male) helical thread 324 and the second inner housing portion 340 defines an internal (i.e., female) helical thread 342, but the opposite configuration is certainly possible in other examples.

In examples consistent with the currently-described figures, the vehicle has a height adjustment drive 350 that is configured to adjust the height of the cutting blade assembly 310 relative to the ground and/or the chassis 110. The height adjustment drive 350 has a height adjustment motor 356 that is in operative communication with the second inner housing portion 340. In particular, the second inner housing portion 340 defines gear teeth 346 about the motor cavity 304, and a pinion gear 352 engages the gear teeth 346 of the second inner housing portion 340. The height adjustment motor 356 is configured to selectively rotate the pinion gear 352 in response to a command input to change the height of the cutting blade assembly 310. More particularly, the height adjustment motor 356 has an output shaft 358 that is fixed to the pinion gear about a shaft opening 354 defined thereby. Rotating of the pinion gear 352 results in rotation of the second inner housing portion 340, which results in axial translation of the first inner housing portion 320. In some embodiments, the height adjustment motor 356 can be omitted, and a manually rotatable handle can be in rotatable communication with the pinion gear 352. The direction of rotation of the pinion gear 352 can be controlled to correspondingly change the direction of axial translation of the first inner housing portion 320.

In some embodiments, the HOC control system has a sensor system having one or more sensors in the vehicle 100 that provide feedback to the controller 120 that represents the estimated height of the cutting blade assembly 310. The controller 120 can use the data representing the estimated height of the cutting blade assembly 310 to selectively operate the height adjustment motor 356 to achieve the desired cutting blade assembly 310 height.

A variety of types of sensors can be used in the sensor system to sense data representing the height of the cutting blade assembly 310. A proximity sensor, such as an electromagnetic sensor, an ultrasonic sensor, photoelectric sensor, or types of proximity sensors, can be configured to sense an axial distance between particular components that correlates with the height of the cutting blade assembly 310. For example, a proximity sensor can be positioned on a bottom surface of the chassis 110 or a top surface of the cutting disk to sense the distance between a bottom surface of the chassis 110 (visible in FIG. 8) and the top surface of the cutting disk 312. As another example, a proximity sensor can be positioned on the annular segment 364 to sense the distance between the annular segment 364 and an outer body 380 (the outer body 380 is described in more detail, below).

In the current example, as visible in FIG. 7, a proximity sensor 396 is positioned on an underside of a casing cover 336 in sensing alignment with a portion of the first inner housing portion 320. For example, the proximity sensor 396 is positioned in axial alignment with an end surface 326 of an inner body 322 of the first inner housing portion 320 to sense the distance between the casing cover 336 and the end surface 326 of the inner body 322. In an example, a target 398 can be positioned on the end surface 326 of the inner body 322 that is in sensing alignment with the proximity sensor. The proximity sensor 396 can be configured to sense the distance of the target 398. Both the casing cover 336 and the inner body 322 are described in detail, below.

In some embodiments the sensor system can be configured to sense the rotational position of the second inner housing portion 340 or the pinion gear 352 (as examples), which the system can be configured to correlate with the height of the cutting blade assembly 310. For example, an encoder can have one or more targets (such as a magnet). The encoder is positioned on one of either a rotationally fixed component or a rotatable component, and each of the one or more targets are positioned on the other of the rotationally fixed component or the rotatable component. The encoder is configured to detect passage of each of the targets as the rotatable component is rotated. The sensed passage of each of the targets can correlate with a particular height of the cutting blade assembly 310 based on the pitch of the helical threads 324, 342. As a more specific example, the encoder can be positioned on an underside of the casing cover 336 and a plurality of targets can be positioned on or adjacent the gear teeth 346. In such an example, the encoder can be circumferentially aligned with each of the targets about the central axis of the housing $x_h$ such that, as the gear teeth 346 are rotated about the housing axis $x_h$, each of the targets are detectable by the encoder.

The cutting blade assembly 310 height can be adjusted from a minimum height $H_{min}$, to a maximum height $H_{max}$ ($H_{max}$ is depicted in FIG. 8; $H_{min}$ is not currently depicted). The minimum height $H_{min}$, corresponds to the position of the cutting blade assembly 310 at its furthest axial distance from the chassis 110 and its closest axial distance to a substantially planar ground surface 10 (resulting in a minimum height-of-cut of grass, for example). The maximum height $H_{max}$ corresponds to the position of the cutting blade assembly 310 at its closest axial distance to the chassis 110 and its furthest axial distance to the substantially planar ground surface 10 (resulting in a maximum height-of-cut of grass, for example).

During autonomous operation of the mower 100, the controller 120 (see FIG. 4) can control rotation of the second inner housing portion 340 and thus adjust the height of the cutting blades 314/cutting blade assembly 310 relative to the ground surface 10 in response to a signal received by the controller 120. For example, the signal could be generated by the sensor 114 (diagrammatically illustrated in FIG. 4) in communication with the controller 120. The sensor 114 can, in some embodiments, be selected from a grass height sensor, a moisture sensor, and a cutting motor load (e.g., current) sensor. The controller 120 can, upon receipt of the signal, automatically increase or decrease the height-of-cut (e.g., control rotation of the second inner housing portion 340) to ensure effective cutting quality.

In some embodiments, the signal to change the cutting height of the cutting blade assembly 310 can be a command issued by an operator, e.g., received via the radio 111 from a remote computer 117 (such as a mobile phone or tablet; FIG. 4) or remote control, or provided directly via a control panel 123 located on the mower itself. That is to say, the operator can manually input the desired height-of-cut, after which the controller 120 will command the rest of the HOC control system to provide the desired height. In some embodiments, the controller 120 can receive a signal representative of a calendar date and then automatically adjust the height-of-cut to better complement the particular mowing season, e.g., a lower height of cut can be automatically selected during autumn.

In some embodiments, the sensor system may be periodically calibrated to maintain accuracy of the estimated height of the cutting blade assembly 310 determined by the HOC control system. For example, on a periodic basis (e.g., daily, weekly, monthly, or after the expiration of a certain number of operating hours), the controller 120 can command the height adjustment motor 356 to raise the cutting blade assembly 310/motor frame 385 to its maximum height $H_{max}$. As this occurs, the second inner housing portion 340 can rotate until the first inner housing portion 320 eventually reaches a stop, at which point the height adjustment motor 356 will stall. Such a stall may be detected by, among other methods, the controller 120 detecting an increase in motor 356 current. Once stall is detected, the controller 120 can terminate current to the height adjustment motor 356 and set the position of the first inner housing portion as equal to the maximum height $H_{max}$. Upon receiving a command to change the cutting height (e.g., directly from the controller 120 or indirectly via a remote computer 117 (see FIG. 4)), the controller 120 can command the height adjustment motor 356 to rotate the second inner housing portion 340 to adjust the cutting height. The controller 120 can estimate a vertical position of the cutting blade assembly 310 by monitoring the sensor system.

To minimize debris/moisture ingress from the cutting chamber 109 (see FIGS. 3 and 8) into the area above the chassis 110, a seal 382 can be disposed between the chassis and the tool drive system 301. While various configurations are certainly possible, the seal 382 can be a flexible annular lip seal that is attached (e.g., fastened, adhered, etc.) to the chassis 110 to engage with interference to form a seal with the motor housing 302 as the latter translates relative to the chassis 110. The seal 382 generally extends radially inward from the chassis 110 to frictionally engage an outer surface of the first inner housing portion 320 around the first inner housing portion 320. The seal 382 can be constructed of a variety of materials and combinations of materials, such as an elastomeric material such as rubber. In the current example, the seal 382 is disposed between the first inner housing portion 320 and the chassis 110 about the cutting assembly opening 124 and is in sealing contact with both the chassis 110 and the first inner housing portion 320. In various embodiments the seal 382 is a wiper seal. The wiper seal can have a wiper lip 381 that contacts the surface of the first inner housing portion 320. In such examples the wiper lip 381 is configured to scrape the surface of the first inner housing portion 320 as the first inner housing portion 320 translates axially through the cutting assembly opening 124 of the chassis. Such scraping functionality can prevent debris on the surface of the first inner housing portion 320

As one of skill can appreciate, the fit between the first helical thread 324 of the first inner housing portion 320 and the second helical thread 342 of the second inner housing portion 340 can contribute to the quality of operation when adjusting the height of the cutting blade assembly 310. It is generally desirable to translate the motor frame 385 upwardly and downwardly without applying excessive force and without binding or chatter during mowing. In some embodiments, smooth operation can be accomplished by tightly controlling and reducing tolerances of the size, location, and parallelism of both the first inner housing portion 320 and the second inner housing portion 340. However, providing such reduced tolerances between components can increase the cost and complexity of manufacture.

In some embodiments it can be desirable to relax the tolerances between the first inner housing portion 320 and the second inner housing portion 340. In such embodiments the seal 382 between the chassis 110 and the first inner housing portion 320 can exert a stabilizing force on the first inner housing portion 320 relative to the chassis 110. The seal 382 can frictionally engage an outer surface of the first inner housing portion 320 about the first inner housing portion 320. As a result, axial translation of the motor frame 385 in each direction can occur relatively smoothly and with limited (or no) binding. Furthermore, shifting of the first inner housing portion 320 (and, therefore, the motor frame 385) in the lateral and longitudinal (fore-and-aft) directions can be reduced or eliminated. By reducing this free play, the cutting blade assembly can operate effectively (e.g., without chattering) even when cutting relatively high grass.

The first inner housing portion 320 can have a variety of different structures to be consistent with the technology disclosed herein. As mentioned above, the first inner housing portion 320 has the motor mounting surface 384 that is fixed to the tool motor 370. In the current example, the first inner housing portion 320 has an inner body 322 that extends from the motor mounting surface 384 towards the second inner housing portion 340. Indeed, as is visible in FIG. 8, the first inner housing portion 320 extends into the second inner housing portion 340. The inner body 322 of the first inner housing portion 320 defines the first helical thread 324, as discussed above.

The first inner housing portion 320 also has an outer body 380 extending axially from the motor mounting surface 384 towards the second inner housing portion 340. The outer body 380 and the inner body 322 define an annular gap 388 that receives a portion of the second inner housing portion 340. The outer body 380 of the first inner housing portion 320 defines an outer cylindrical surface 386 that is in contact with the seal 382 and translates in the axial direction against the seal 382 as the height of the cutting blade assembly 310 is adjusted.

In the current example, the first inner housing portion 320 has an inner body 322, an outer body 380, and a motor frame 385 that are separate components fixed together, but in some other embodiments the inner body 322, outer body 380 and/or the motor frame 385 can be a single, unitary structure.

In various embodiments the motor housing 302 has a casing 330 that is generally configured to house portions of the HOC control system positioned above the chassis. The casing 330 generally houses the first inner housing portion 320 and the second inner housing portion 340. The casing 330 surrounds the first inner housing portion 320 and the second inner housing portion 340 above the chassis 110. In the current example, the casing 330 has a main section 332 that extends axially from the chassis 110 towards the gear teeth 346 of the second inner housing portion 340. The casing 330 has a secondary section 334 that is fixed to the main section 332. In various embodiments the secondary section 334 and the main section 332 form a seal. The secondary section 334 extends axially from the main section 332 to surround the gear teeth 346 of the second inner housing portion 340 and the pinion gear 352 (FIG. 6). The casing 330 also has a casing cover 336 fixed to the secondary section 334. The casing cover 336 extends across the distal end of the secondary section 334, where the "distal end" is the end furthest from the chassis 110 in the axial direction. In various embodiments, the casing cover 336 and the secondary section 334 form a seal.

While the casing 330 has three main components in the example design, in some other embodiments the casing can be formed with fewer components or more components. In some examples, the main section 332 and the secondary section 334 can form a unitary structure. In some examples, the secondary section 334 and the casing cover 336 can form a unitary structure. The casing 330, in particular the main section 332 of the casing 330, is fixed to the chassis 110 with one or more fasteners (not currently visible). As such, the casing 330 is axially fixed and rotatably fixed relative to the chassis 110. A casing seal 333 can be disposed between the casing 330 and the chassis 110. While in the current example, the casing 330 does not extend around the height adjustment motor 356, in some other embodiments, the casing 330 does extend around the height adjustment motor 356 to contain the height adjustment motor 356.

In examples consistent with the current design, the casing 330 forms a mounting structure 360 on which the second inner housing portion 340 is rotatably mounted. In particular, the main section 332 of the casing 330 has an inner wall 362 extending in the axial direction about the housing axis $x_h$. The inner wall 362 has a cylindrical shape. The inner wall 362 defines a chamber 366 (FIG. 7) that is configured to receive the second inner housing portion 340 and accommodate rotation of the second inner housing portion 340. As such, the chamber 366 has a central axis that is the housing axis $x_h$.

The inner wall 362 of the casing 330 is radially spaced from the main section 332 and fixed to the main section 332 via an annular segment 364 towards the distal end of the main section 332. The mounting structure 360 has an inwardly extending radial flange 368 towards a proximal end of the inner wall 362 that forms a first annular mounting surface 367 which receives and accommodates rotation of a proximal end 348 of the second inner housing portion 340. The mounting structure 360 also has a second annular mounting surface 361 on its distal end that is configured to receive and accommodate rotation of a portion of the second inner housing portion 340. The mounting structure 360 can have other configurations, as well. In the current example, the main section 332, annular segment 364 and inner wall 362 are a unitary structure, but in other embodiments one or more of those elements can be separate components that are fixed together.

In examples, the outer body 380 of the first inner housing portion 320 extends axially into the annular space between the inner wall 362 and the main section 332 of the casing 330. Also, the inner wall 362 extends axially into the annular gap 388 between the inner body 322 and outer body 380. Such a configuration creates a tortuous fluid pathway radially inward from the outside of the main section 332 towards the tool motor 370.

In various embodiments the first inner housing portion 320 is rotatably fixed relative to the chassis 110 via a radial alignment feature 390 (best visible in FIG. 8) that is configured to radially align the first inner housing portion 320 and the casing 330. In the current example the radial alignment feature 390 is a protrusion 392 extending radially from the outer body 380 of the first inner housing portion 320 that is received by a corresponding radial slot 394 defined by the casing 330. The radial slot 394 extends axially along the casing 330 to accommodate the protrusion 392 across the axial translation range of the first inner housing portion 320. In this particular example, the protrusion 392 extends radially outward from the outer body 380 and the radial slot 394 is defined by the main section 332 of the casing 330. Other configurations can be used, however. For example, the casing 330 can define a radial protrusion and the first inner housing portion 320 can define a corresponding radial slot. In some embodiments the radial protrusion can extend radially inward.

Figure 9:
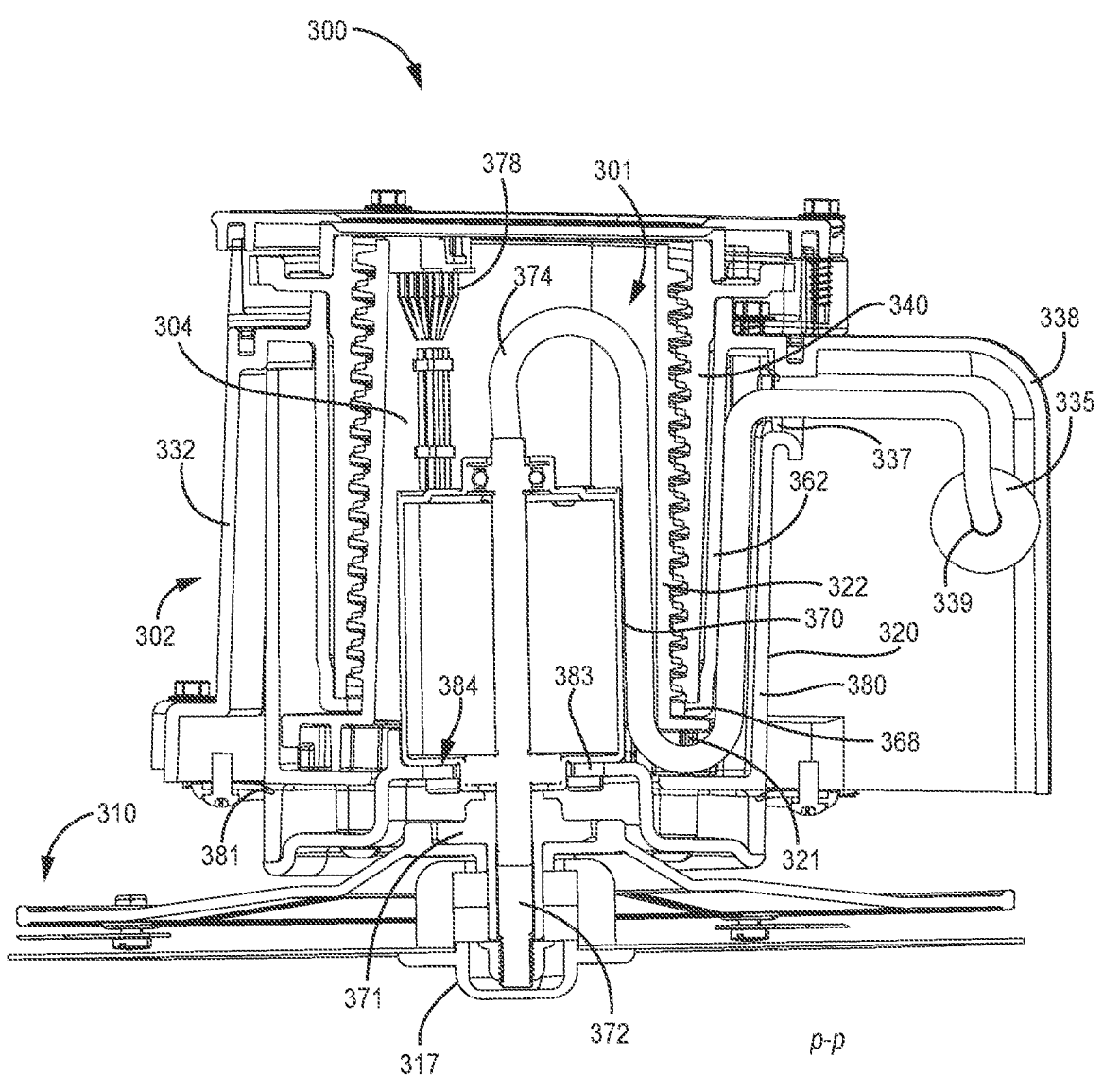
FIG. 9 is yet another cross-sectional view consistent with the cutting assembly of FIG. 5

FIG. 9 depicts another example cross-sectional view p-p of the cutting assembly 300 of FIGS. 5-8 such that the routing of the power cord 374 through the cutting assembly 300 to the tool motor 370 is more clearly visible. In this example, the main section 332 and the outer body 380 of the first inner housing portion 320 defines a first cord opening 337 through which the power cord 374 passes. The main section 332 has a cord housing 338 extending radially outward from the rest of the main section 332. The cord housing also extends axially downward towards the chassis 110 (not currently depicted, but the cord housing 338 and the chassis 110 are partially visible in FIG. 8). Like the rest of the main section 332, the cord housing 338 forms a seal with the chassis 110. The cord housing 338 defines a second cord opening 339 through which the power cord 374 passes from outside the cutting assembly 300 to inside the cutting assembly 300. A cord seal 335 can be disposed between the cord housing 338 and the power cord 374 in the second cord opening 339.

The power cord 374 is generally routed through the components of the cutting assembly 300 that are rotatably fixed relative to the chassis 110. In particular, in this example, the power cord 374 is routed from outside the cutting assembly 300 through the second cord opening 339 and from the cord housing 338 through the first cord opening 337. From the first cord opening 337 the power cord 374 extends axially towards the chassis 110 within a gap between the outer body 380 of the first inner housing portion 320 and the inner wall 362 of the main section 332. The power cord 374 passes through a third cord opening 321 defined by the inner body 322 of the first inner housing portion 320 and extends axially along the motor cavity 304 to the tool motor 370. Notably, the power cord 374 bypasses the second inner housing portion 340, which is rotatable relative to the chassis 110. The power cord 374 does not pass through the second inner housing portion 340. Such a configuration can prevent wrapping of the power cord 374 about system components as the second inner housing portion 340 is rotated.

The cord housing 338 and motor cavity 304 can generally be configured to house a linear length of the power cord 374 to accommodate axial translation of the cutting blade assembly 310 (and, therefore, the tool motor 370) from the minimum height $H_{min}$ to the maximum height $H_{max}$ positions.

Figure 10:
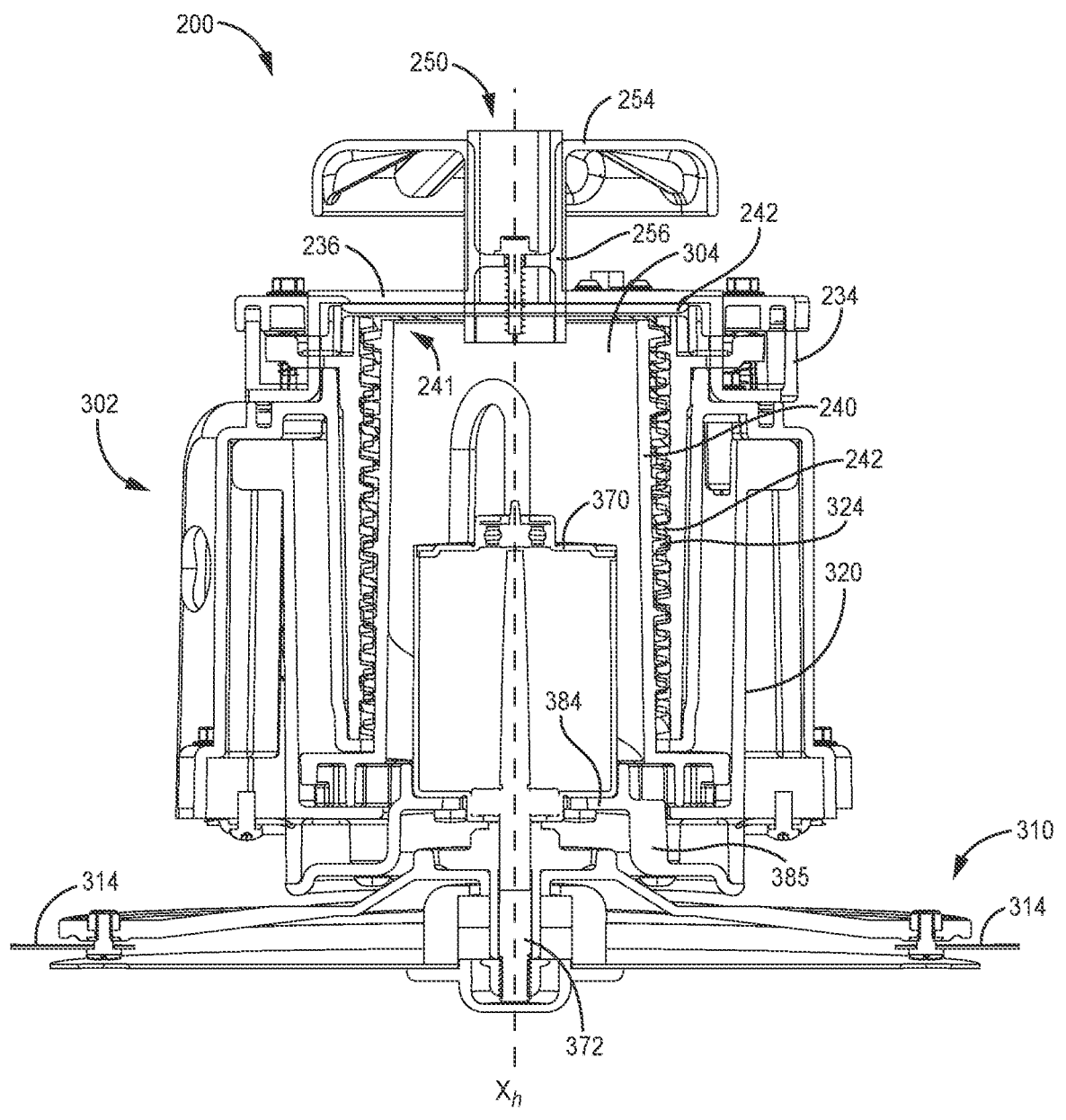
FIG. 10 is a cross-sectional view of an alternate example cutting assembly consistent with the technology disclosed herein.
Figure 11:
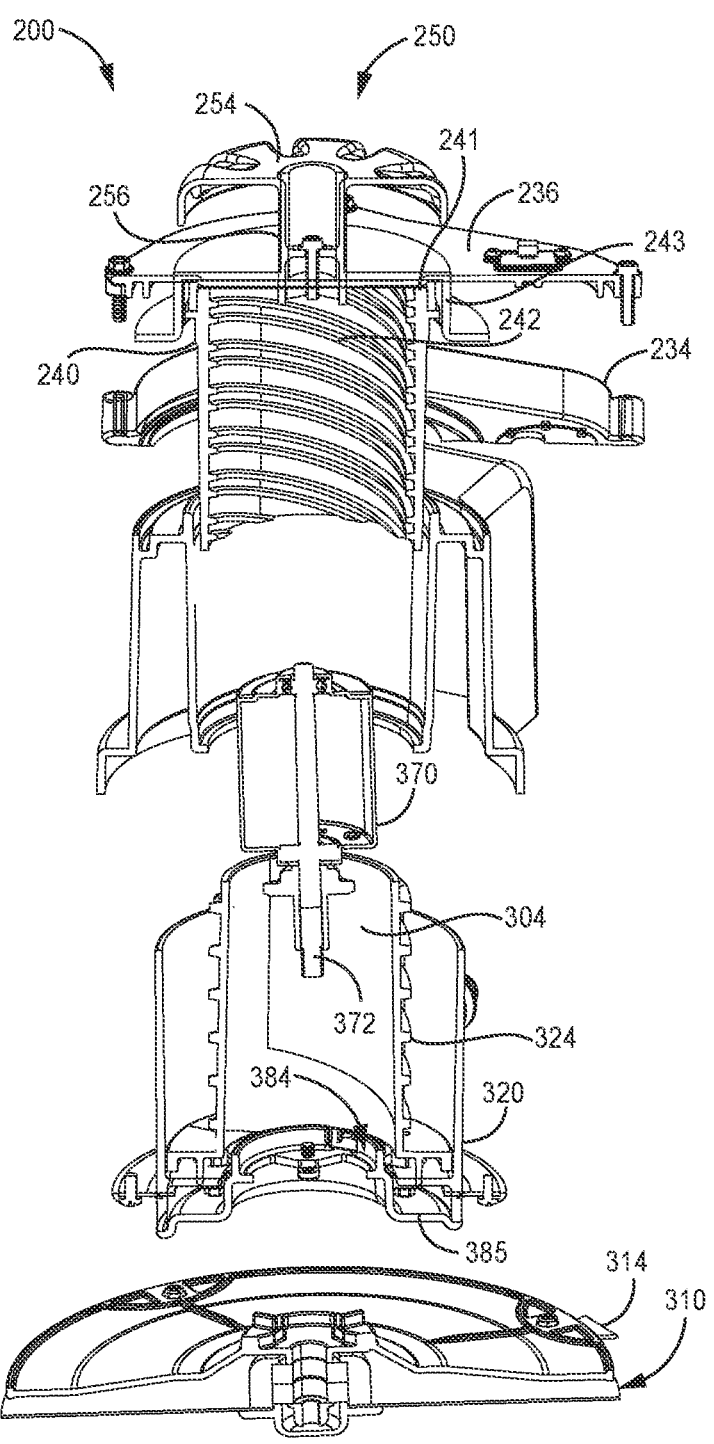
FIG. 11 is an exploded cross-sectional view of an example cutting assembly consistent with FIG. 10.

While described above as utilizing a powered or automatic HOC control system (using the height adjustment motor 356), such a configuration is not limiting. For example, embodiments in which the mower operator can manually adjust the height-of-cut are also contemplated. FIG. 10 illustrates a cross-sectional view of such a manual height adjustment system of a cutting assembly 200 consistent with FIG. 3, and FIG. 11 is an exploded view consistent with FIG. 10.

In general, the cutting assembly 200 can be similar to the cutting assembly 300 already described herein with respect to FIGS. 6-9 and, as a result, like reference numerals are used where appropriate. The descriptions of similar components described earlier herein generally apply to corresponding components in the current figure unless contradictory to the current description. The cutting assembly 200 can have a motor housing 302 that is configured to be coupled to a chassis 110 (FIG. 3). The motor housing 302 defines a motor cavity 304 extending in an axial direction. In particular, the motor housing 302 has a first inner housing portion 320 and a second inner housing portion 240. Each of the first inner housing portion 320 and the second inner housing portion 240 are translatable relative to the chassis 110 and are operatively coupled to modify the height of cutting blades 314 in a cutting blade assembly 310. The first inner housing portion 320 has the motor frame 385, which defines the motor mounting surface 384. A tool motor 370 is fixed to the motor mounting surface 384. The tool motor 370 has an output shaft 372 extending in a first direction (e.g., in the direction of central axis $x_h$).

The first inner housing portion 320 and the second inner housing portion 240 are in threaded engagement. The first inner housing portion 320 defines a first helical thread 324 about the motor cavity 304 and the second housing portion defines a second helical thread 242 about the motor cavity 304. The second helical thread 242 engages the first helical thread 324. The first inner housing portion 320 is axially translatable and rotatably fixed relative to the chassis 110, and the second inner housing portion 240 is axially fixed relative to the chassis 110 and rotatable relative to the chassis 110. As such, when the second inner housing portion 240 rotates relative to the chassis 110 (and the first inner housing portion 320), the interaction between the first helical thread 324 and the second helical thread 242 results in axial translation of the first inner housing portion 320 and, therefore, the motor mounting surface 384 and the cutting blade assembly 310, relative to the chassis 110 (and the second inner housing portion 240).

The currently described cutting assembly 200 differs from previously described examples, however, in that it eliminates the height adjustment motor 356 of the height adjustment drive 350 of FIGS. 5-9. In its place, the height adjustment drive 250 can have a manual turn screw 256 fixed to the second inner housing portion 240. The turn screw 256 can extend axially through the motor housing 302 (in particular, the casing cover 236 of the motor housing 302) and can have an axis of rotation that is colinear with the housing axis $x_h$. A knob 254 can be attached or otherwise affixed to an upper end of the turn screw 256 such that rotation of the knob 254 causes rotation of the turn screw 256 and, correspondingly, rotation of the second inner housing portion 240. In particular, a cover 243 is fixed to a distal end 241 of the second inner housing portion 240 and extends across a distal end of the motor cavity 304. The turn screw 256 is fixed to the cover 243 such that manual rotation of the turn screw 256 results in rotation of the second inner housing portion 240. For the same reasons already set forth herein, such drive screw rotation can proportionally adjust the height-of-cut by axially translating the motor frame 385 (via the first inner housing portion 320) upwardly or downwardly. In some embodiments, a 360° rotation of the drive screw results in linear translation of the cutting blade assembly 310 across its full range.

The knob 254 can protrude outside and above the motor housing 302 so that it is accessible to the operator as needed. For example, as visible in FIG. 3, the roof portion 104 of the bump shroud 118 can have a knob access opening 113 through which a user can access the knob 254. In some embodiments, a knob access cover can be disposed over the knob access opening 113. In such embodiments the knob access cover can be a hinged or sliding cover over the knob access opening 113 through which the knob 254 is accessible. In some embodiments, the knob 254 can have a crank offset from the rotational axis of the turn screw 256 to provide an alternate gripping surface for rotation of the knob 254. In some embodiments, such a crank can fold or telescope outwardly from the knob when needed and otherwise collapse. Yet other embodiments can forgo the crank altogether in lieu of some other type of easily gripped knob surface, e.g., knurls, spokes, depressions, etc., consistent with FIGS. 3 and 11.

While shown as extending upwardly through a top of the motor housing 302, the knob 254 of the turn screw 256 can alternatively extend through one of the sides of the motor housing 302. In such a case, the height adjustment drive 250 might require additional elements (e.g., bevel gears, shafts, etc.) to convert rotation of the knob to rotation of the turn screw 256.

In some embodiments, a cutting assembly 200/300 can be designed to have a modular configuration such that a height adjustment drive can be optionally manual or automatic. For example, the second inner housing portion 340, the height adjustment drive 350, the casing cover 236 and the secondary section 334 consistent with FIG. 7 is configured to be detached from the cutting assembly 300 and replaced with the second inner housing portion 240, the height adjustment drive 250, the casing cover 236 and the secondary section 234 of FIG. 11. In some embodiments the height adjustment motor 356 depicted in FIG. 7 is configured to be detachable from the pinion gear 352 and a manually rotatable handle is configured to be attached in operable communication with the pinion gear 352. In some embodiments, the knob 254 and, potentially, the turn screw 256 are replaceable with a height adjustment motor having an output shaft that is configured to be coupled to the cover 243. Other embodiments are certainly contemplated.

Figure 12:
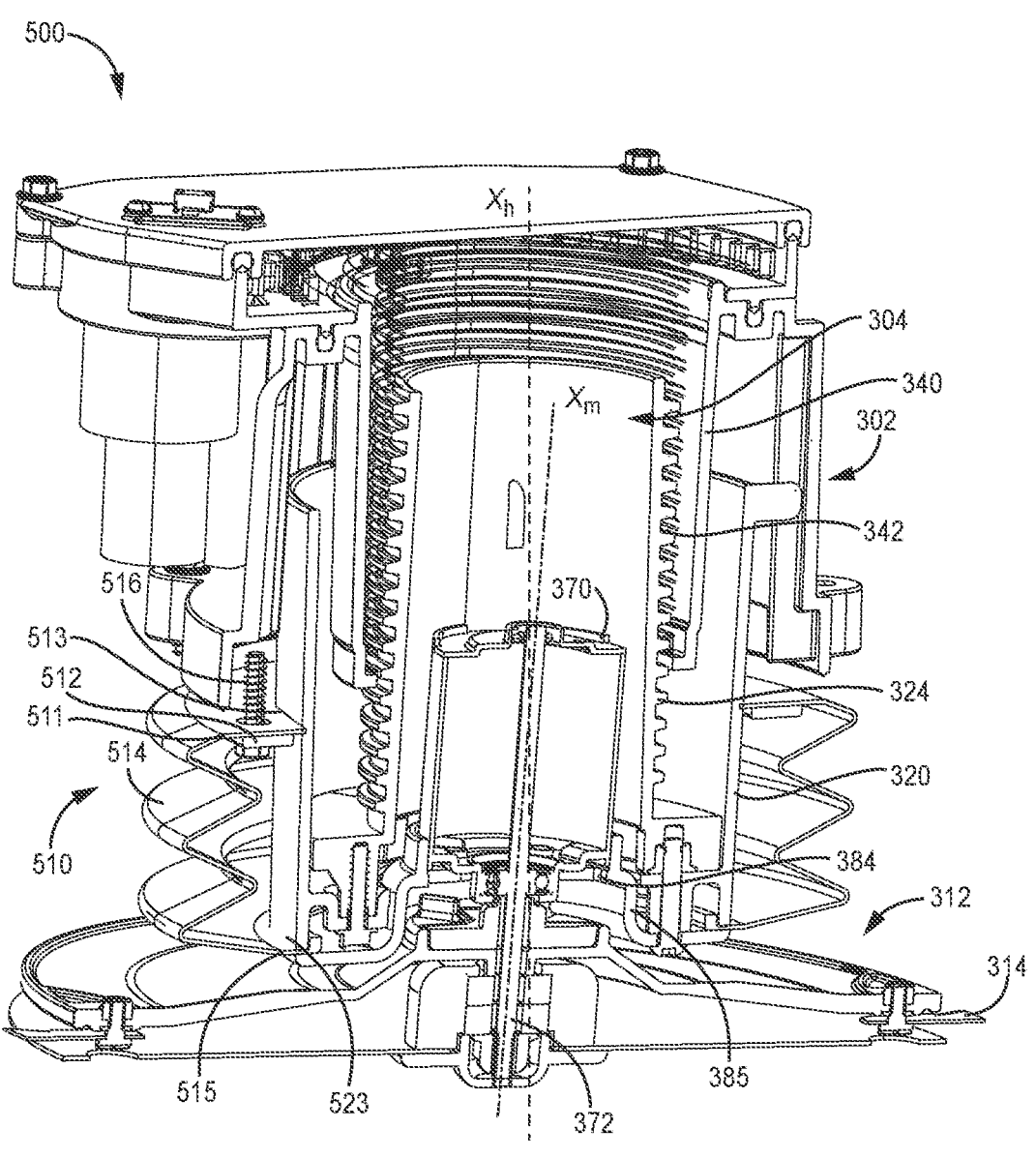
FIG. 12 is a cross-sectional view of yet another alternate example cutting assembly consistent with the technology disclosed herein.

FIG. 12 depicts yet another example of a cutting assembly 500, consistent with various embodiments. In general, the cutting assembly 500 can be similar to the cutting assembly 300 already described herein with respect to FIGS. 5-9 and, as a result, like reference numerals are used where appropriate. The descriptions of similar components described earlier herein generally apply to corresponding components in the current figure unless contradictory to the current description.

The cutting assembly 500 has a motor housing 302 that is configured to be coupled to a chassis 110 (FIG. 3). The motor housing 302 defines a motor cavity 304 extending in an axial direction $x_h$. In particular, the motor housing 302 has a first inner housing portion 320 and a second inner housing portion 340. Each of the first inner housing portion 320 and the second inner housing portion 340 are translatable relative to the chassis 110 and are operatively coupled to modify the height of cutting blades 314 in a cutting blade assembly 310. The first inner housing portion 320 has the motor frame 385, which defines the motor mounting surface 384. A tool motor 370 is fixed to the motor mounting surface 384. The tool motor 370 has an output shaft 372 extending in a first direction (e.g., in the direction of central axis of the motor $x_m$).

The first inner housing portion 320 and the second inner housing portion 340 are in threaded engagement. In particular, the first inner housing portion 320 defines a first helical thread 324 about the motor cavity 304 and the second inner housing portion 340 defines a second helical thread 342 about the motor cavity 304, similar to previously-described examples. The first helical thread 324 and the second helical thread 342 are in threaded engagement about the central axis of the housing $x_h$. The first inner housing portion 320 is axially translatable and rotatably fixed relative to the chassis 110. The second inner housing portion 340 is axially fixed relative to the chassis 110 and rotatable relative to the chassis 110. As such, when the second inner housing portion 340 rotates relative to the chassis 110 (and the first inner housing portion 320), the second helical thread 342 rotates relative to the first helical thread 324, which results in axial translation of the first inner housing portion 320 and, therefore, the motor mounting surface 384 and the cutting blade assembly 310, relative to the chassis 110 (and the second inner housing portion 240).

The current example has a modified seal configuration compared to previously depicted examples. A seal assembly 510 is configured to be disposed across the cutting assembly opening 124 between the chassis 110 (see FIGS. 3 and 8) and the motor housing 302 to limit the ingress of debris to the motor cavity 304. In the current example, the seal assembly 510 has a bellows 514 that forms a seal between the chassis 110 and the cutting assembly 500 across the cutting assembly opening 124. The bellows 514 has a first end 511 that is configured to be sealed to the chassis 110 about the cutting assembly opening 124. The bellows 514 has a second end 515 that is sealed around a portion of the motor housing 302 (such as the first inner housing portion 320) that is positioned within the cutting assembly opening 124 (see FIG. 8). As such, the bellows 514 defines a barrier across the cutting assembly opening 124 between the chassis 110 and the motor housing 302. In various embodiments, the second end 515 of the bellows 514 is coupled to the first inner housing portion 320. In particular, the second end 515 of the bellows 514 is coupled to the first inner housing portion 320 towards the end 523 of the first inner housing portion 320 under the chassis 110.

The bellows 514 lengthens and shortens in the axial direction between a collapsed configuration and an expanded configuration, which accommodates the range of axial translation of the first inner housing portion 320 relative to the chassis 110. At the minimum cutting height $H_{min}$ the bellows 514 is in its expanded position and at the maximum cutting height $H_{max}$, the bellows 514 is in its collapsed position.

In the current example, the seal assembly 510 has an annular seal 512 that sealably couples the bellows 514 to the chassis 110 about the cutting assembly opening 124. The annular seal 512 is configured to be attached, such as with a fastener 516, to the chassis 110. The seal 512 is configured to be disposed between the first inner housing portion 320 and the chassis 110 about the cutting assembly opening 124 (similar to as depicted in FIG. 8). In various embodiments, the annular seal 512 has a stabilizer portion 513 that is configured to exert a stabilizing force on the first inner housing portion 320 relative to the chassis 110, as has been discussed above. The stabilizer portion 513 extends radially inward from the bellows 514 towards the first inner housing portion 320. The stabilizer portion 513 frictionally engages the outer surface of first inner housing portion 320 around the first inner housing portion 320. In some embodiments the stabilizer portion 513 is a single cohesive inner radial surface in surrounding engagement with the first inner housing portion 320. In some embodiments the stabilizer portion 513 is a series of discrete surfaces each engaging the first inner housing portion 320 and collectively surrounding the first inner housing portion 320.

In some embodiments, similar to examples described above, the annular seal 512 can also be configured to sealably engage the motor housing 302 as it axially translates relative to the chassis 110. The seal 512 makes sealing contact with the first inner housing portion 320 in addition to the chassis 110. Similar to the examples discussed above, the seal 512 can be a wiper seal where the stabilizing portion 513 further defines a wiper lip that is configured to scrape the surface of the first inner housing portion 320 as it translates axially through the cutting assembly opening 124 (see FIG. 8).

Figure 13:
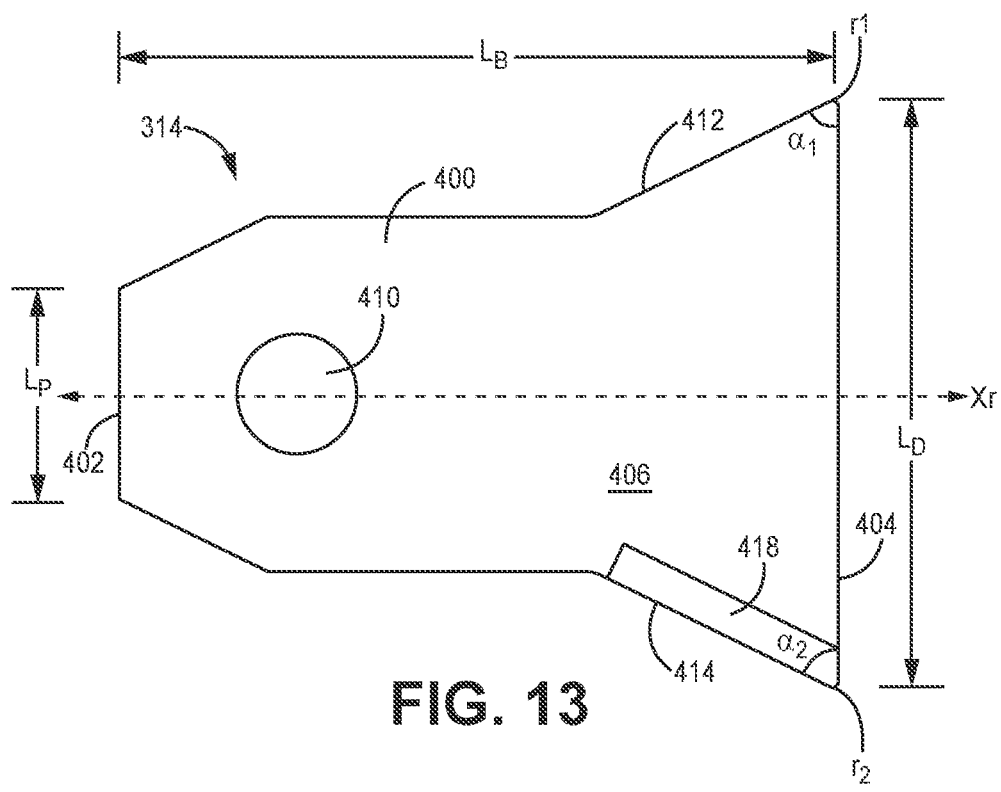
FIG. 13 is a facing view of an example cutting blade.
Figure 14:
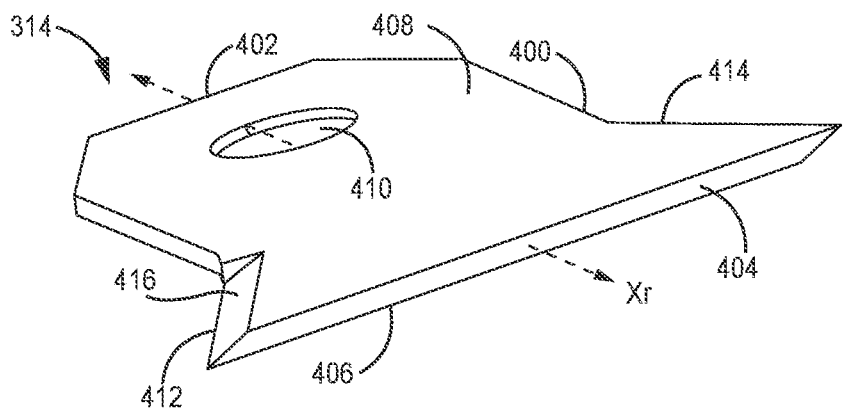
FIG. 14 is perspective view consistent with the example cutting blade of FIG. 13.
Figure 15:
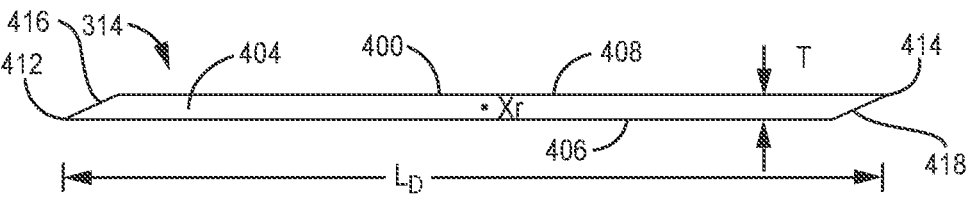
FIG. 15 is another facing view consistent with the example cutting blade of FIG. 13.

Cutting assemblies 200, 300 consistent with the technology disclosed herein can incorporate cutting blades having a variety of different configurations and combinations of configurations. FIGS. 13-15 depict an example cutting blade 314, such as a cutting blade 314 visible in FIG. 5. As described above, the cutting assembly 300 can have a cutting disk 312 coupled to the output shaft 372 of the tool motor 370, and a plurality of cutting blades 314 can be coupled to the cutting disk 312. Each cutting blade 314 can extend outward from the cutting disk 312.

Referring now specifically to FIGS. 13-15, where FIG. 13 is a facing view of a profile of an example cutting blade 314, FIG. 14 is a perspective view of the example cutting blade 314, and FIG. 15 is a facing view of a distal end 404 of the example cutting blade 314. The cutting blade 314 generally has a blade body 400 having a proximal end 402, a distal end 404, and a length $L_B$ extending from the proximal end 402 to the distal end 404. The term "distal end" in the context of the cutting blade 314 is the outermost end of the blade relative to the central axis $x_m$ of the motor 370. The cutting blade 314 has a first face 406 and a second face 408. The cutting blade 314 has a thickness T from the first face 406 to the second face 408 (FIG. 15).

The proximal end 402 is generally configured to be coupled to a cutting disk 312, which is visible in FIGS. 5 and 6. In this example, the blade body 400 defines a fastener opening 410 towards the proximal end 402. The fastener opening 410 is configured to receive a blade fastener 315 that fastens the cutting blade 314 and the cutting disk 312. The proximal end 402 has a length $L_P$. The length of the proximal end $L_P$ is generally in a width direction, which is orthogonal to both the blade length $L_B$ of the blade body 400 and the blade thickness T of the blade body 400. In various embodiments, the length of the proximal end $L_P$ is the narrowest portion of the blade body 400 in the width direction. In the current example, the proximal end 402 generally defines a plane surface, but in other embodiments the proximal end 402 can define a segmented or curved surface.

The distal end 404 of the blade body 400 is configured to be positioned outward from the cutting disk (also visible in FIG. 5). In a variety of embodiments, the distal end 404 defines a plane surface orthogonal to the blade length $L_B$. The distal end 404 defines a distal end length $L_D$ orthogonal to the blade length $L_B$ and the blade thickness T. In a variety of embodiments, the length of the distal end $L_D$ defines a widest portion of the blade body 400 in the width direction. The length of the distal end $L_D$ can vary, but in various embodiments the length of the distal end $L_D$ is at least 1 cm.

The blade body 400 is generally configured such that the width of the blade body tapers from the distal end towards the proximal end. Such a configuration distributes the center of mass of the cutting blade 314 closer to the distal end 404 than the proximal end 402. As discussed above, when a mower is in operation, the cutting disk 312 (FIG. 6) rotates about the output shaft 372, which rotates each of the cutting blades 314 about the output shaft 372. Positioning the center of mass closer to the distal end 404 than the proximal end 402 of the blade body 400 can help resist pivoting of the blade body 400 relative to the cutting disk 312 in response to normal cutting operations where the blade body 400 is striking and severing stalks of grass and weeds. Also, a relative increase in the mass of the cutting blade 314 can increase the momentum of the cutting blades 314 when the cutting blade assembly 310 (FIGS. 5-6) is in operation, which can reduce the amount of energy (such as battery power) required to maintain the cutting blade assembly 310 in operation.

Returning specifically to FIGS. 13-15, the blade body 400 defines a first cutting edge 412 that is configured to sever stalks of grass and weeds. The first cutting edge 412 can be defined by the first face 406. In various embodiments, the first cutting edge 412 is mutually defined by the intersection of the first face 406 and a first edge plane 416 that extends from the second face 408 to the first face 406. The first edge plane 416 defines a taper in the thickness T of the blade body from the second face 408 to the first cutting edge 412. In various embodiments, the first cutting edge 412 is straight, meaning that the first cutting edge 412 extends along a straight line. The first cutting edge 412 generally intersects the distal end 404 of the cutting blade 314, however the intersection can form a relatively small radius $r_1$, such as currently depicted. In various embodiments, the first cutting edge 412 forms an acute angle cu with the distal end 404. The first cutting edge 412 extends from the distal end 404 towards the proximal end 402.

In various embodiments, the blade body 400 defines a second cutting edge 414 that is configured to sever stalks of grass and weeds. The second cutting edge 414 can be defined by the second face 408. In various embodiments, the second cutting edge 414 is mutually defined by the intersection of the second face 408 and a second edge plane 418 that extends from the first face 406 to the second face 408. The second edge plane 418 defines a taper in the thickness T of the blade body 400 from the first face 406 to the second face 408 at the second cutting edge 414. In various embodiments, the second cutting edge 414 is straight. The second cutting edge 414 generally intersects the distal end 404 of the cutting blade 314, however the intersection can form a relatively small radius $r_2$. In various embodiments, the second cutting edge 414 forms an acute angle $\alpha_2$ with the distal end 404. The second cutting edge 414 extends from the distal end 404 towards the proximal end 402.

In some embodiments, the second cutting edge 414 can be omitted. In various embodiments, only one of the first cutting edge 412 and the second cutting edge 414 is in severing engagement with grass/weeds during mower operation. However, in examples consistent with the currently-described embodiments, the cutting blade 314 is rotationally symmetric about a rotational axis $x_r$ parallel to the length direction of the cutting blade 314. The rotational axis $x_r$ is central to the thickness T and width of the cutting blade 314. If the first cutting edge 412 becomes dull or is subject to a replacement schedule, the cutting blade 314 can be detached from the cutting disk 312, rotated 180° about the rotational axis $x_r$, and reattached to the cutting disk 312 so that the second cutting edge 414 is configured to be in severing engagement with the grass/weeds.

In various embodiments, the tool motor 370 (see FIG. 8, for example) is configured to rotate its output shaft 372 and therefore, the cutting blade assembly 310, in a first direction about the tool axis $x_t$ such that the first cutting edge 412 is in severing engagement with grass/weeds during mower operation. In many such embodiments, the tool motor 370 is configured to rotate its output shaft 372 and therefore, the cutting blade assembly 310, in a second, opposite direction about the tool axis $x_t$ such that the second cutting edge 414 is in severing engagement with grass/weeds during mower operation. Such a configuration can advantageously extend the time between service intervals because the cutting life of the blades is essentially doubled.

In various embodiments a controller such as described above can be in operative communication with the motor to control the direction of rotation of the output shaft 372. In some embodiments, the controller can be configured to provide a command to the motor to reverse the rotation of the output shaft 372. Such a command can be provided upon identifying that rotation of the output shaft 372 in a first direction has exceeded a threshold length of time, for example. In such embodiments, the mower can advantageously ensure that a relatively sharp cutting blade is in use. In some embodiments, the controller can be configured to provide a command to the motor to reverse the rotation of the output shaft 372 upon receiving input from a user through a user interface such as a control panel or remote computer. In some embodiments, the direction of rotation of the output shaft 372 is selectable by a user.

In various embodiments, the first cutting edge 412 and the second cutting edge 414 diverge from each other as they approach the distal end 404 of the cutting blade 314. The oblique orientation of the first cutting edge 412 (and the second cutting edge 414) relative to the length direction of the blade body 400 can increase the cutting capacity of the edges 412, 414 compared to a cutting edge that is parallel to the length of the blade body 400.

Illustrative embodiments are described, and reference has been made to possible variations of the same. These and other variations, combinations, and modifications will be apparent to those skilled in the art, and it should be understood that the claims are not limited to the illustrative embodiments set forth herein.

What is claimed is:

1. An autonomous ground working vehicle comprising:
a chassis;
wheels coupled to the chassis;
a motor housing coupled to the chassis, the motor housing defining a motor cavity extending in an axial direction, the motor housing comprising a first inner housing portion having a first helical thread about the motor cavity and a second inner housing portion having a second helical thread about the motor cavity that engages the first helical thread, wherein the first inner housing portion has a motor mounting surface and is axially translatable relative to the chassis and rotatably fixed relative to the chassis, and the second inner housing portion is rotatable relative to the chassis and axially fixed relative to the chassis, and wherein the first inner housing portion comprises:
an inner body extending from the motor mounting surface into the second inner housing portion, wherein the inner body defines the first helical thread; and
an outer body outside of the inner body extending axially from the motor mounting surface, wherein the outer body and the inner body define an annular gap that receives a portion of the second inner housing portion;
a tool motor fixed to the motor mounting surface, the tool motor having an output shaft extending in a first direction; and
a tool fixed to the output shaft.

2. The vehicle of claim 1, the second inner housing portion further comprising gear teeth about the motor cavity, and the vehicle comprising a pinion gear engaging the gear teeth.

3. The vehicle of claim 2, further comprising a height adjustment motor operatively coupled to the pinion gear.

4. The vehicle of claim 1, wherein the output shaft of the tool motor has a tool axis and the motor housing has a housing axis, and the tool axis is non-parallel to the housing axis.

5. The vehicle of claim 4, wherein the motor mounting surface is orthogonal to the tool axis.

6. The vehicle of claim 1, wherein the motor housing further comprises a casing fixed to the chassis, the casing surrounding the first inner housing portion.

7. The vehicle of claim 1, wherein the chassis defines a cutting assembly opening receiving the first inner housing portion, and the vehicle further comprises a wiper seal disposed between the first inner housing portion and the chassis about the cutting assembly opening, wherein the wiper seal contacts the first inner housing portion and the chassis.

8. The vehicle of claim 1, further comprising a manually rotatable handle configured to selectively rotate the second inner housing portion.

9. The vehicle of claim 1, wherein the tool comprises a cutting disk coupled to the output shaft and a plurality of cutting blades coupled to the cutting disk, wherein each cutting blade extends outward from the cutting disk and defines a first straight cutting edge, a proximal end, and a distal end, wherein the first straight cutting edge intersects the distal end and forms an acute angle with the distal end.

10. The vehicle of claim 9, wherein each cutting blade defines a second straight cutting edge that intersects the distal end, wherein the first cutting edge and the second cutting edge diverge from each other as they approach the distal end.

11. The vehicle of claim 1, wherein the chassis defines a cutting assembly opening receiving the first inner housing portion, and the vehicle further comprises a bellows sealably coupled to the first inner housing portion and the chassis to seal the cutting assembly opening between the first inner housing portion and the chassis.

12. An autonomous ground working vehicle comprising:
a chassis defining a cutting assembly opening;
wheels coupled to the chassis;
a motor housing coupled to the chassis, the motor housing defining a motor cavity extending in an axial direction, the motor housing comprising a first inner housing portion received by the cutting assembly opening, the first inner housing portion having a first helical thread about the motor cavity and a second inner housing portion having a second helical thread about the motor cavity that engages the first helical thread, wherein the first inner housing portion has a motor mounting surface and is axially translatable relative to the chassis and rotatably fixed relative to the chassis, and the second inner housing portion is rotatable relative to the chassis and axially fixed relative to the chassis;
a tool motor fixed to the motor mounting surface, the tool motor having an output shaft extending in a first direction;
a tool fixed to the output shaft;
a bellows sealably coupled to the first inner housing portion and the chassis to seal the cutting assembly opening between the first inner housing portion and the chassis;
a wiper seal disposed between the first inner housing portion and the chassis about the cutting assembly opening, wherein the wiper seal contacts the first inner housing portion and the chassis; and
a casing fixed to the chassis, wherein the casing comprises a main section, an annular segment, and an inner wall radially spaced from the main section via the annular segment, wherein the first inner housing portion extends axially into the annular space between the inner wall and the main section of the casing.

13. The vehicle of claim 12, wherein the first helical thread is an outer helical thread and the second helical thread is an inner helical thread.

14. The vehicle of claim 12, wherein, the casing has a first annular mounting surface that receives a proximal end of the second inner housing portion and the casing has a second annular mounting surface that receives a portion of the second inner housing portion.

15. An autonomous ground working vehicle comprising:

a chassis;

wheels coupled to the chassis;

a motor housing coupled to the chassis, the motor housing defining a motor cavity extending in an axial direction, the motor housing comprising a first inner housing portion, the first inner housing portion having an outer helical thread about the motor cavity and a second inner housing portion having an inner helical thread about the motor cavity that engages the outer helical thread, wherein the first inner housing portion has a motor mounting surface and is axially translatable relative to the chassis and rotatably fixed relative to the chassis, and the second inner housing portion is rotatable relative to the chassis and axially fixed relative to the chassis;

a tool motor fixed to the motor mounting surface, the tool motor having an output shaft extending in a first direction;

a tool fixed to the output shaft; and a casing fixed to the chassis, wherein the casing comprises a main section, an annular segment, and an inner wall radially spaced from the main section via the annular segment, wherein the first inner housing portion extends axially into the annular space between the inner wall and the main section of the casing.

16. The vehicle of claim 15, wherein, the casing has a first annular mounting surface that receives a proximal end of the second inner housing portion and the casing has a second annular mounting surface that receives a portion of the second inner housing portion.

17. The vehicle of claim 15, wherein the chassis defines a cutting assembly opening receiving the first inner housing portion, and the vehicle further comprises a wiper seal disposed between the first inner housing portion and the chassis about the cutting assembly opening, wherein the wiper seal contacts the first inner housing portion and the chassis.

18. The vehicle of claim 15, wherein the first inner housing portion comprises:

an inner body extending from the motor mounting surface into the second inner housing portion, wherein the inner body defines the outer helical thread; and an outer body extending axially from the motor mounting surface towards the second inner housing portion, wherein the outer body and the inner body define an annular gap that receives a portion of the second inner housing portion.

\* \* \* \* \*